US009046883B2

(12) United States Patent
Guo et al.

(10) Patent No.: US 9,046,883 B2
(45) Date of Patent: Jun. 2, 2015

(54) METHOD AND APPARATUS FOR STATION ENERGY CONSUMPTION MANAGEMENT AND PRESENTATION

(75) Inventors: Jia Guo, Shenzhen (CN); Jian Gao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 312 days.

(21) Appl. No.: 13/560,532

(22) Filed: Jul. 27, 2012

(65) Prior Publication Data

US 2013/0166083 A1    Jun. 27, 2013

(30) Foreign Application Priority Data

Jul. 30, 2011    (CN) .......................... 2011 1 0216727

(51) Int. Cl.
| | |
|---|---|
| *G05D 11/00* | (2006.01) |
| *G05B 15/02* | (2006.01) |
| *H04L 29/08* | (2006.01) |
| *H04L 12/26* | (2006.01) |
| *G06Q 50/06* | (2012.01) |
| *G06Q 99/00* | (2006.01) |
| *H04L 12/28* | (2006.01) |

(52) U.S. Cl.
CPC ................ *G05B 15/02* (2013.01); *H04L 67/18* (2013.01); *H04L 43/045* (2013.01); *G06Q 50/06* (2013.01); *G06Q 99/00* (2013.01); *H04L 12/2825* (2013.01); *H04L 12/2834* (2013.01); *H04L 2012/285* (2013.01)

(58) Field of Classification Search
USPC ............................ 700/291; 370/401; 715/786
See application file for complete search history.

(56) References Cited

U.S. PATENT DOCUMENTS

| | | | |
|---|---|---|---|
| 6,421,355 B1 * | 7/2002 | Quiring et al. ................ 370/468 |
| 6,424,355 B2 | 7/2002 | Watanabe et al. | |
| 7,299,055 B1 | 11/2007 | Phillips et al. | |

(Continued)

FOREIGN PATENT DOCUMENTS

| | | |
|---|---|---|
| CN | 101872437 A | 10/2010 |
| CN | 101881944 A | 11/2010 |

(Continued)

OTHER PUBLICATIONS

International Search Report issued in corresponding PCT Patent Application No. PCT/CN2012/072181, mailed Jun. 14, 2012.

(Continued)

*Primary Examiner* — Robert Fennema
*Assistant Examiner* — Anthony Whittington
(74) *Attorney, Agent, or Firm* — Brinks Gilson & Lione

(57) ABSTRACT

The present invention discloses a station energy consumption management method, which includes: obtaining location information of a station and an energy consumption value that corresponds to the station; according to the obtained location information and corresponding energy consumption value of the station, graphically representing the station and the energy consumption value on a display interface; generating an energy consumption value selection control that is graphical and presented on the display interface; obtaining the at least one target energy consumption value or the target energy consumption value range through the energy consumption value selection control, and accordingly highlighting, the graphical station complying with a preset display rule and the corresponding graphical energy consumption value.

32 Claims, 22 Drawing Sheets

(56) References Cited

U.S. PATENT DOCUMENTS

| | | | |
|---|---|---|---|
| 7,945,658 B1 | 5/2011 | Nucci et al. | |
| 2004/0061701 A1 | 4/2004 | Arquie et al. | |
| 2009/0287433 A1* | 11/2009 | Houston et al. | 702/62 |
| 2010/0185976 A1* | 7/2010 | Sadanandan | 715/786 |
| 2011/0184581 A1* | 7/2011 | Storch et al. | 700/295 |
| 2011/0299547 A1* | 12/2011 | Diab et al. | 370/401 |
| 2012/0029720 A1* | 2/2012 | Cherian et al. | 700/297 |

FOREIGN PATENT DOCUMENTS

| | | |
|---|---|---|
| CN | 101977126 A | 2/2011 |
| CN | 201765486 U | 3/2011 |
| CN | 102027383 A | 4/2011 |
| CN | 102055244 A | 5/2011 |
| CN | 102307106 A | 1/2012 |
| EP | 0412692 A1 | 2/1991 |
| EP | 2023532 A1 | 2/2009 |
| WO | WO 02/065346 A1 | 8/2002 |

OTHER PUBLICATIONS

Search Report issued in corresponding Chinese Patent Application No. 20111021672.7, mailed Feb. 20, 2013.

* cited by examiner

| | RNCID | NodeB Name | Cell ID | Cell Name | Longitude | Latitude | Altitude | Antenna Supplier | Antenna Type |
|---|---|---|---|---|---|---|---|---|---|
| 2 | 526 | 508310002B | 2 | 508310002:S1:Cov | 3649826 | 5481158 | 311 | | K_742_212_8_U |
| 3 | 526 | 508310002B | 20002 | 508310002:S2:Cov | 3649826 | 5481158 | 311 | | K_742_212_8_U |
| 4 | 526 | 508310002B | 40002 | 508310002:S3:Cov | 3649826 | 5481158 | 311 | | K_742_212_8_U |
| 5 | 526 | 508310003B | 3 | 508310003:S1:Cov | 3650047 | 5479712 | 311 | | K_742_212_6_U |
| 6 | 526 | 508310003B | 20003 | 508310003:S2:Cov | 3650047 | 5479712 | 311 | | K_742_212_6_U |
| 7 | 526 | 508310003B | 40003 | 508310003:S3:Cov | 3650047 | 5479712 | 311 | | K_742_212_6_U |
| 8 | 526 | 508310007M | 7 | 508310007:S1:Cov | 3652510 | 5482843 | 325 | | K_800_10247_12_U |
| 9 | 526 | 508310007M | 20007 | 508310007:S2:Cov | 3652510 | 5482843 | 325 | | K_800_10247_12_U |
| 10 | 526 | 508310007M | 40007 | 508310007:S3:Cov | 3652510 | 5482843 | 325 | | K_800_10247_12_U |
| 11 | 526 | 508310008C | 8 | 508310008:S1:Cov | 3651361 | 5482797 | 322 | | K_742_212_4_U |
| 12 | 526 | 508310008C | 20008 | 508310008:S2:Cov | 3651361 | 5482797 | 322 | | K_742_212_4_U |
| 13 | 526 | 508310008C | 40008 | 508310008:S3:Cov | 3651361 | 5482797 | 322 | | K_742_212_6_U |
| 14 | 526 | 508310009A | 9 | 508310009:S1:Cov | 3647556 | 5482185 | 305 | | K_742_212_8_U |
| 15 | 526 | 508310009A | 20009 | 508310009:S2:Cov | 3647556 | 5482185 | 305 | | K_742_212_8_U |
| 16 | 526 | 508310009A | 40009 | 508310009:S3:Cov | 3647556 | 5482185 | 305 | | K_742_212_8_U |
| 17 | 526 | 508310011B | 11 | 508310011:S1:Cov | 3648352 | 5479055 | 317 | | K_742_215_9_U |
| 18 | 526 | 508310011B | 20011 | 508310011:S2:Cov | 3648352 | 5479055 | 317 | | K_742_215_8_U |
| 19 | 526 | 508310011B | 40011 | 508310011:S3:Cov | 3648352 | 5479055 | 317 | | K_742_215_6_U |
| 20 | 526 | 508310012A | 12 | 508310012:S1:Cov | 3646548 | 5478842 | 323 | | K_742_212_7_U |
| 21 | 526 | 508310012A | 20012 | 508310012:S2:Cov | 3646548 | 5478842 | 323 | | K_742_212_7_U |
| 22 | 526 | 508310012A | 40012 | 508310012:S3:Cov | 3646548 | 5478842 | 323 | | K_742_212_6_U |
| 23 | 526 | 508310013A | 13 | 508310013:S1:Cov | 3653564 | 5481633 | 313 | | K_742_212_4_U |
| 24 | 526 | 508310013A | 20013 | 508310013:S2:Cov | 3653564 | 5481633 | 313 | | K_742_212_4_U |
| 25 | 526 | 508310013A | 40013 | 508310013:S3:Cov | 3653564 | 5481633 | 313 | | K_742_212_4_U |
| 26 | 526 | 508310014A | 14 | 508310014:S1:Cov | 3652165 | 5482328 | 321 | | K_742_212_5_U |
| 27 | 526 | 508310014A | 20014 | 508310014:S2:Cov | 3652165 | 5482328 | 321 | | K_742_212_8_U |
| 28 | 526 | 508310014A | 40014 | 508310014:S3:Cov | 3652165 | 5482328 | 321 | | K_742_212_7_U |
| 29 | 526 | 508310015A | 15 | 508310015:S1:Cov | 3644360 | 5483610 | 301 | | K_742_212_8_U |
| 30 | 526 | 508310015A | 20015 | 508310015:S2:Cov | 3644360 | 5483610 | 301 | | K_742_212_7_U |
| 31 | 526 | 508310015A | 40015 | 508310015:S3:Cov | 3644360 | 5483610 | 301 | | K_742_212_6_U |
| 32 | 526 | 508310016A | 16 | 508310016:S1:Cov | 3644718 | 5486586 | 303 | | K_742_215_6_U |

METHOD AND APPARATUS FOR STATION ENERGY CONSUMPTION MANAGEMENT AND PRESENTATION

CROSS-REFERENCE TO RELATED APPLICATIONS

This application claims priority to Chinese Patent Application No. 201110216727.X, filed on Jul. 30, 2011, which is hereby incorporated by reference in its entirety.

FIELD OF THE INVENTION

The present invention relates to the field of communications, and in particular, to a station energy consumption management technology in the field of communications.

BACKGROUND OF THE INVENTION

In the field of communications, efficient management of station energy consumption has always been an urgent problem to be solved by each operator. Currently, for energy consumption management of each station, usually energy consumption values of the stations are presented to a user through a method using a list, and the user manually performs selection and classification or further energy consumption management on the energy consumption values of the stations. Such an energy consumption management method is relatively low in efficiency; an impression of an energy consumption state of each station is not intuitive; an overall energy consumption condition of a whole area covered by stations cannot be perceived intuitively either: and energy consumption management efficiency of the whole station is relatively low.

SUMMARY OF THE INVENTION

Embodiments of the present invention provide an intuitive and efficient method and apparatus for station energy consumption management and presentation.

A station energy consumption management method includes:

obtaining location information of a station and an energy consumption value that corresponds to the station;

according to the obtained location information and corresponding energy consumption value of the station, graphically representing the station and the energy consumption value that corresponds to the station on a display interface;

generating an energy consumption value selection control that is graphical and presented on the display interface, where the energy consumption value selection control is configured to select at least one target energy consumption value or a target energy consumption value range; and obtaining the at least one target energy consumption value or the target energy consumption value range selected through the energy consumption value selection control, and highlighting the graphical station complying with a preset display rule and the graphical energy consumption value that corresponds to the graphical station complying with the preset display rule according to the target energy consumption value or the target energy consumption value range selected by the energy consumption value selection control.

A station energy consumption presentation method includes:

displaying, through a display interface, stations in different geographical locations and energy consumption labels that are corresponding to the stations, where the energy consumption labels are used to indicate energy consumption levels of the stations;

generating an energy consumption value selection control on the display interface displaying the stations and the energy consumption labels of the stations, where the energy consumption value selection control is configured to select an energy consumption level or an energy consumption level range; and highlighting a station complying with a preset display rule and the energy consumption label that corresponds to the station according to the energy consumption level selected by the energy consumption value selection control.

A station energy consumption management system includes:

an information obtaining module, configured to obtain location information of a station and an energy consumption value that corresponds to the station;

a graphical interface generation module, configured to graphically represent, according to the obtained location information and corresponding energy consumption value of the station, the station and the energy consumption value that corresponds to the station on a display interface;

a control generation module, configured to generate an energy consumption value selection control that is graphical and presented on the display interface, where the energy consumption value selection control is configured to select at least one target energy consumption value or a target energy consumption value range; and a station filtering module, configured to obtain the at least one target energy consumption value or the target energy consumption value range selected through the energy consumption value selection control, and highlight the graphical station complying with a preset display rule and the graphical energy consumption value that corresponds to the graphical station complying with the preset display rule according to the target energy consumption value or the target energy consumption value range selected by the energy consumption value selection control. A station energy consumption presentation apparatus includes:

a station and energy consumption display module, configured to display, through a display interface, stations in different geographical locations and energy consumption labels that are corresponding to the stations, where the energy consumption labels are used to indicate energy consumption levels of the stations;

a control generation module, configured to generate an energy consumption value selection control on the display interface displaying the stations and the energy consumption labels of the stations, where the energy consumption value selection control is configured to select an energy consumption level or an energy consumption level range; and a station filtering module, configured to highlight a station complying with a preset display rule and an energy consumption label that corresponds to the station according to the energy consumption level or the energy consumption level range selected by the energy consumption value selection control.

In the method and apparatus for station energy consumption management and presentation provided by the embodiments of the present invention, the geographical location information of the station and the energy consumption value of the station are graphically represented on the display interface, so that an administrator can intuitively observe geographical distribution of the station and an energy consumption condition of each station. The energy consumption value selection control for selecting the energy consumption value or the energy consumption value range is generated on the display interface, so that the administrator can rapidly and conveniently select a desired target energy consumption value or target energy consumption value range. After the target energy consumption value or the target energy consumption range is selected, the graphical station complying with a preset display rule and the graphical energy consumption value that corresponds to the graphical station complying with the preset display rule are highlighted, so that the administrator can intuitively select a desired station, and rapidly understand the energy consumption condition corresponding to the station, so as to make energy consumption management of the station convenient.

DETAILED DESCRIPTION OF THE EMBODIMENTS

Figure 1:
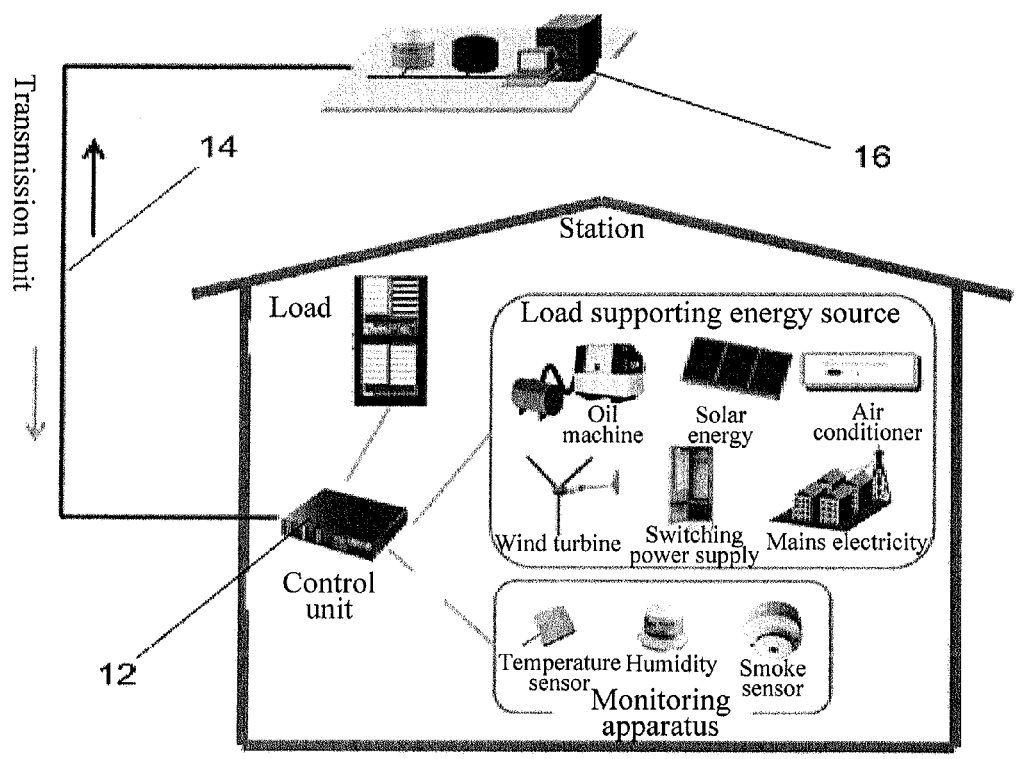
FIG. 1 is an operating environment of a station energy consumption management method according to an embodiment of the present invention.

Referring to FIG. 1, an embodiment of the present invention provides an operating environment of a station energy consumption management method, that is, hardware architecture for implementing the present invention, which includes a control unit 12, a transmission unit 14, and a net management unit 16.

The control unit 12 is configured to be connected to loads such as a base station, load supporting energy sources such as an oil machine, solar energy, a wind turbine, a battery and a power supply, various load energy consumption monitoring devices, and load operating environment monitoring devices such as a temperature sensor, a humidity sensor and a smoke sensor in a station through a control interface, and is configured to obtain an operating parameter of the loads in the station and transmit the operating parameter to the net management unit 16 through the transmission unit 14, and meanwhile, may perform unified energy consumption management and scheduling on the loads and load supporting energy sources according to a control signal sent by the net management unit 16. The operating parameter may include, but not limited to, a location parameter of the station, a station energy consumption value (an energy consumption value of the load), an ambient temperature of the load, an operating temperature of the load, and energy supply parameters (including a current and a voltage) of various energy devices. The foregoing operating parameter may be used by the net management unit 16 to judge a working condition of the load and to send a control instruction accordingly.

Figure 2:
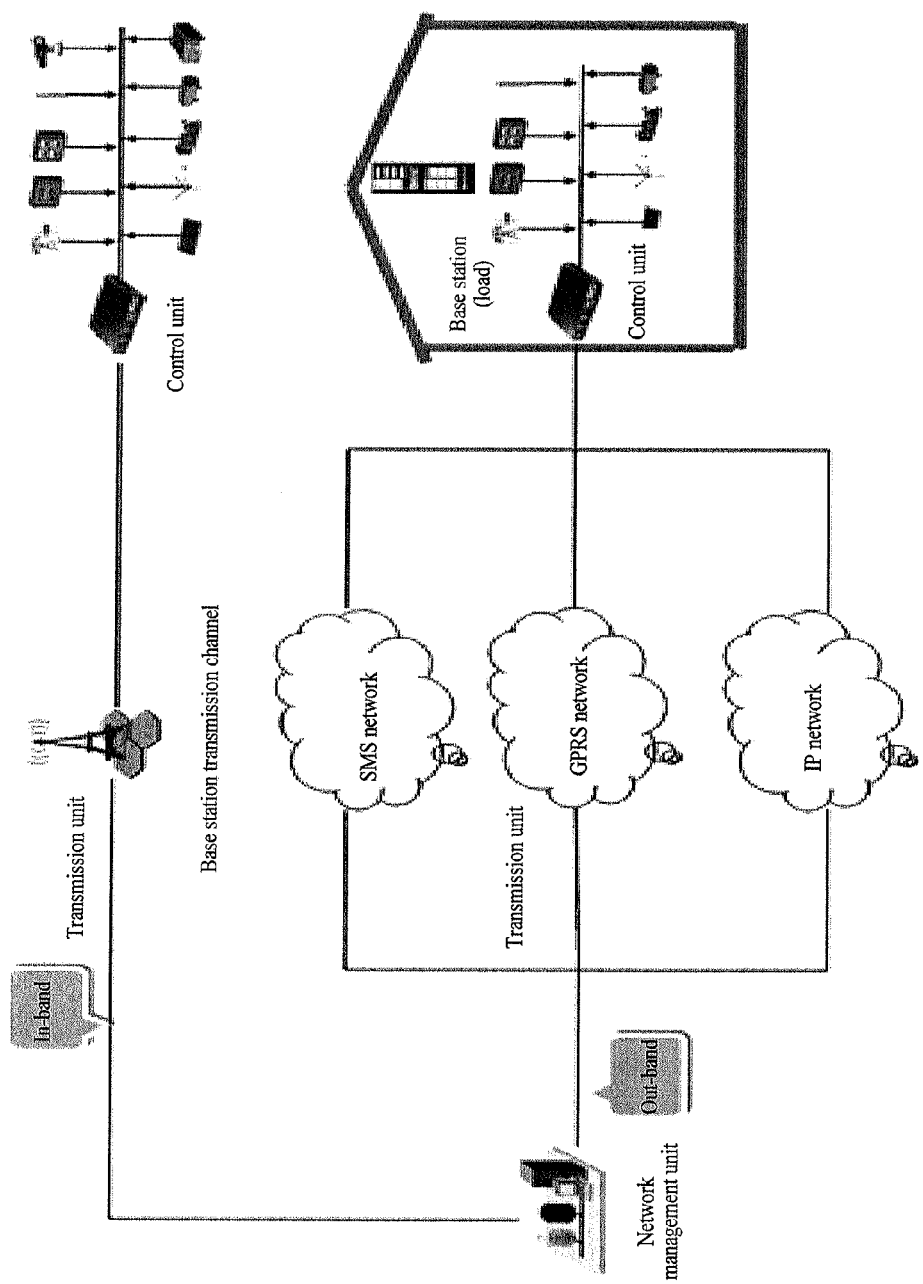
FIG. 2 is a diagram of a data transmission mode in an operating environment of the station energy consumption management method provided in FIG. 1.

The transmission unit 14 is configured to perform bidirectional data transmission between the control unit 12 and the net management unit 16. The data may be the operating parameter of the load and the control instruction that is sent by the net management unit 16. In order to adapt to a current erection environment of an energy consuming device and transmission network, and to adapt to a future development trend of the energy consuming device and transmission network, a transmission mode of the transmission unit 14 may be two transmission modes shown in FIG. 2, namely, an in-band transmission mode and an out-band transmission mode. Specifically, the in-band transmission mode refers to that a controller of the control unit 12 reports collected information through a channel (E1) of a base station (GSM/UMTS/LTE/CDMA/WIMAX), so as to transmit state information and energy consumption information of the load and the supporting device that are obtained by the control unit 12 to the network management unit 12 in real time. The out-band transmission mode refers to that the control unit 12 transmits the obtained state information and energy consumption information of the load and the supporting device back to the net management unit 16 through an independent channel such as a short message, a GPRS and an IP.

The net management unit 16 is configured to monitor and manage various in-network devices, and may be specifically configured to adjust an operating parameter, an environmental parameter and a control parameter of the in-network device. The net management unit 16 includes a display apparatus, a processing apparatus, a storage apparatus, an input apparatus, and a data bus that is connected to the foregoing various apparatuses.

A station energy consumption management method and a station energy consumption presentation method that are provided by the embodiment of the present invention are illustrated below based on the hardware architecture introduced above. It should be noted that, the foregoing hardware architecture is an exemplary solution that is provided to describe the present invention clearly. The present invention may be run in any hardware environment that is capable of implementing the content of the present invention, which is not limited to the foregoing hardware architecture.

An embodiment of the present invention provides a station energy consumption management method, which includes:

obtaining location information of a station and an energy consumption value that corresponds to the station;

according to the obtained location information and corresponding energy consumption value of the station, graphically representing the station and the energy consumption value that corresponds to the station on a display interface;

generating an energy consumption value selection control that is graphical and presented on the display interface, where the energy consumption value selection control is configured to select at least one target energy consumption value or a target energy consumption value range; and obtaining the at least one target energy consumption value or the target energy consumption value range selected through the energy consumption value selection control, and highlighting the graphical station complying with a preset display rule and the graphical energy consumption value that corresponds to the graphical station complying with the preset display rule according to the target energy consumption value or the target energy consumption value range selected by the energy consumption value selection control.

In the station energy consumption management method, the geographical location information of the station and the energy consumption value of the station are obtained, and the geographical location information of the station and the energy consumption value of the station are graphically represented on the display interface, so that an administrator can intuitively observe geographical distribution of the station and an energy consumption condition of each station. The energy consumption value selection control for selecting the energy consumption value or the energy consumption value range is generated on the display interface, so that the administrator can rapidly and conveniently select a desired target energy consumption value or target energy consumption value range. After the target energy consumption value or the target energy consumption range is selected, the graphical station complying with a preset display rule and the graphical energy consumption value that corresponds to the graphical station complying with the preset display rule are highlighted, so that the administrator can intuitively select a desired station, and rapidly understand the energy consumption condition corresponding to the station, so as to make energy consumption management of the station convenient.

Further, in the station energy consumption management method provided by the embodiment of the present invention, the graphically representing the station and the energy consumption value that corresponds to the station on the display interface according to the obtained location information and corresponding energy consumption value of the station includes:

generating a visual station distribution diagram according to the obtained location information of the station; and graphically representing the obtained energy consumption value corresponding to the station in the visual station distribution diagram, where the graphical station energy consumption value and a geometric position of the corresponding station in the station distribution diagram are associated with each other.

In the method, the visual distribution diagram of the station is generated according to the location information of the station, so that the administrator can locate the station conveniently. Meanwhile, the corresponding graphical energy consumption value of the station is associated with the station with respect to the geometric position, so that the administrator can rapidly understand the energy consumption state of the station.

Further, in the station energy consumption management method provided by the embodiment of the present invention, the graphically representing the station and the energy consumption value that corresponds to the station on the display interface according to the obtained location information and corresponding energy consumption value of the station further includes: rating energy consumption of the stations according to the energy consumption values that are corresponding to the stations, and applying different visual elements to stations of different energy consumption levels.

In the method, applying different visual elements to stations of different energy consumption levels may further improve identifiability of the energy consumption condition, so that the administrator can rapidly identify the energy consumption label of each station, thereby determining the energy consumption state of each station.

Further, in the station energy consumption management method provided by the embodiment of the present invention, the highlighting the graphical station complying with the preset display rule and the graphical energy consumption value that corresponds to the graphical station complying with the preset display rule according to the target energy consumption value or the target energy consumption value range selected by the energy consumption value selection control includes: comparing the energy consumption value of the station with the selected target energy consumption value or target energy consumption value range, and highlighting the graphical station which has an energy consumption value greater than the target energy consumption value and the graphical energy consumption value that corresponds to the graphical station.

In the method, it is specified that the preset display rule is specifically set to display the graphical station that has the energy consumption value greater than the target energy consumption value and the graphical energy consumption value that corresponds to the graphical station, so as to enable a display manner of the graphical station and the graphical energy consumption value that corresponds to the graphical station to comply with a daily operating habit of the user better, so that the user can rapidly grasp, according to experience thereof, a method of using the energy consumption value selection control, thereby improving interface friendliness of the station energy consumption management method of the present invention.

Further, in the station energy consumption management method provided by the embodiment of the present invention, at the same time of or after the comparing the energy consumption value of the station with the selected target energy consumption value or target energy consumption value range and highlighting the graphical station that has the energy consumption value greater than the target energy consumption value, the method further includes: weakening representation of a graphical station not complying with the preset display rule and a corresponding graphical energy consumption value.

In the embodiment of the present invention, through the method, the selected station complying with the preset display rule and the corresponding energy consumption state are further highlighted, so that the administrator can manage the selected station conveniently.

Further, in the station energy consumption management method provided by the embodiment of the present invention, the generating the energy consumption value selection control that is graphical and presented on the display interface where the energy consumption value selection control is configured to select at least one target energy consumption value or a target energy consumption value range includes: generating the energy consumption value selection control that is graphical and presented on the display interface, and associating the energy consumption value selection control with the energy consumption value that corresponds to the station, where a maximum target energy consumption value that is capable of being selected by the energy consumption value selection control is not smaller than an energy consumption value of a station consuming greatest energy, and a minimum target energy consumption value that is capable of being selected by the energy consumption value selection control is not greater than an energy consumption value of a station consuming least energy.

In the method, the energy consumption value selection control is associated with the energy consumption value corresponding to the station, so as to enable a value selection range of the energy consumption value selection control to match the current energy consumption value corresponding to the station, so that the administrator can precisely select the target energy consumption value or the target energy consumption value range.

Further, in the station energy consumption management method provided by the embodiment of the present invention, the generating the energy consumption value selection control that is graphical and presented on the display interface includes: generating a graphical ruler that takes the energy consumption value as a scale, and generating at least one graphical vernier that is capable of moving along the graphical ruler to select the target energy consumption value or the target energy consumption value range.

In the method, the energy consumption value selection control is set as the ruler that takes the energy consumption value as a scale, and the vernier that is capable of moving along the graphical ruler is generated for a user to select the target energy consumption value, which complies with a use habit of the user, intuitively reflects a function of the energy consumption value selection control, saves a process in which the user is required to learn the use method and function of the energy consumption value selection control, and is convenient for use.

Further, the station energy consumption management method provided by the embodiment of the present invention further includes: obtaining a set region type. The highlighting the graphical station complying with the preset display rule and the graphical energy consumption value that corresponds to the graphical station complying with the preset display rule according to the target energy consumption value or the target energy consumption value range selected by the energy consumption value selection control includes:

matching the location information of the graphical station complying with the preset display rule with the obtained region type, and highlighting the graphical station matching the obtained region type and the graphical energy consumption value that corresponds to the graphical station.

Further, based on the method, the station energy consumption management method provided by the embodiment of the present invention further includes: weakening representation of the graphical station and the graphical energy consumption value that corresponds to the station, where the graphical station is among the graphical stations complying with the preset display rule and does not match the obtained region type.

In the method, the user is allowed to obtain the station complying with region type characteristics according to the preset region type, so as to combine the selection of the target energy consumption value or the target energy consumption value range to select the station from a two-dimensional perspective, thereby further facilitating the use by the administrator and improving the experience of the user.

Further, in the station energy consumption management method provided by the embodiment of the present invention, the obtaining the set region type includes: classifying the geographical location information of the station, and generating, according to the geographical location information classification, a region type selection menu represented on the display interface, where the region type selection menu is used to select one or more region types.

In the method, the user is allowed to associate the geographical location information of the station with the region type, so as to combine the selection of the target energy consumption value to select the station from a two-dimensional perspective, thereby further facilitating the use by the administrator and improving the experience of the user.

Further, the station energy consumption management method provided by the embodiment of the present invention further includes: generating an energy saving control that is presented on the display interface, selecting, an energy saving control parameter of the station through the energy saving control, and configuring the selected energy saving control parameter on the highlighted station. Accordingly, The obtaining the location information of the station and the energy consumption value that corresponds to the station includes: obtaining the location information of the station and the energy consumption value that corresponds to the station configured with the control parameter.

The graphically representing the station and the energy consumption value that corresponds to the station on the display interface according to the obtained location information of the station and corresponding energy consumption value includes: graphically representing the station and the energy consumption value that corresponds to the station configured with the control parameter on the display interface according to the obtained location information of the station and the energy consumption value that corresponds to the station configured with the control parameter.

In the method, an energy saving control parameter may be selected through an energy saving control that is presented on the display interface, and the selected energy saving control parameter is configured on each highlighted station, that is, the selected station, and the station may adjust a working state or an operation mode thereof according to the energy saving control parameter, so as to achieve the objective of energy saving. Meanwhile, after the energy saving control parameter is configured to the station and the station adjusts the working state according to the control parameter, a current energy consumption state of the station is fed back instantly, and the graphical energy consumption value of the station is updated, so that the user can intuitively know the energy consumption state of the station after the energy saving control in time.

A station energy consumption management method 100 provided by an embodiment of the present invention is illustrated below in detail.

Figure 3:
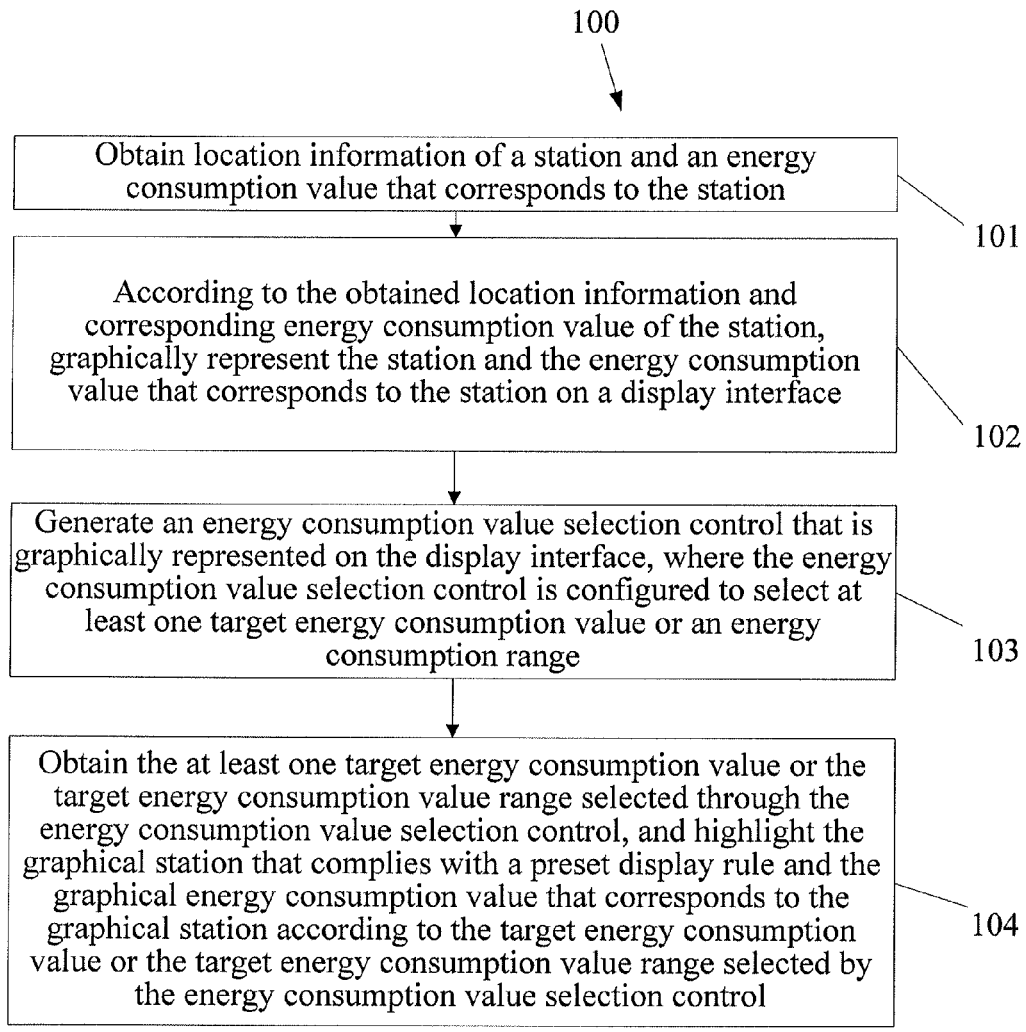
FIG. 3 is a flow chart of a station energy consumption management method according to an embodiment of the present invention.

Referring to FIG. 3, the station energy consumption management method 100 provided by the embodiment of the present invention includes:

101: Obtain location information of a station and an energy consumption value that corresponds to the station.

Figures 4, 5:
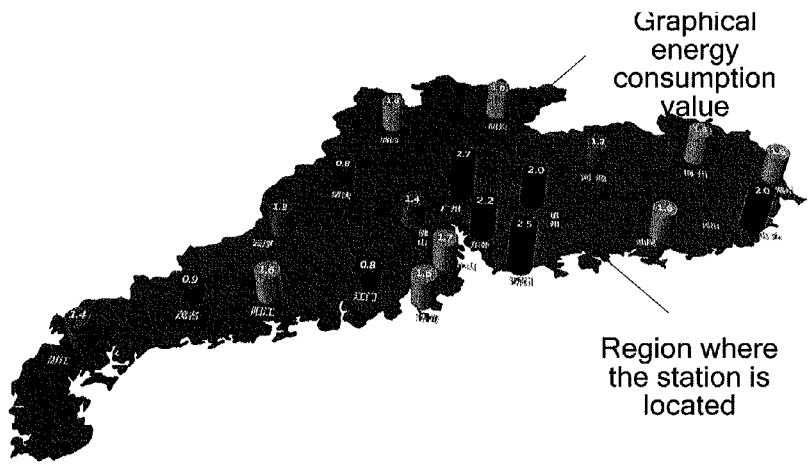
FIG. 4 is an engineering parameter information table of a station used in a station energy consumption management method according to an embodiment of the present invention.
FIG. 5 is a regional comprehensive energy consumption diagram generated according to an energy consumption management method provided by an embodiment of the present invention.

When station energy consumption management is performed, it is required to obtain a station that needs to be monitored and managed and a corresponding energy consumption condition of the station first. The stations are usually distributed in different geographical locations. Therefore, in order to understand a distribution condition of the stations, geographical location information of the stations is required to be obtained. The obtaining the geographical location information of the station and the corresponding energy consumption value may be implemented by a management unit 12 that is deployed in the station. That is, the management unit 12 instantly obtains the corresponding information of the station actively or passively under triggering of a control instruction. Optionally, the geographical location information of the station may also be pre-stored in a memory. That is, when the station is erected, the geographical location information of the station is recorded in an engineering parameter information table shown in FIG. 4. The engineering parameter information table includes various information, and the geographical location information of the station is recorded in the engineering parameter information table in the form of global positioning system (GPS) information. When necessary, the GPS information of the station in the engineering parameter information table can be invoked directly. Similarly, the energy consumption value corresponding to the station may also be obtained by the management unit 12 regularly and stored in a storage apparatus, updated regularly, and invoked directly from the storage apparatus during use.

102: According to the obtained location information and corresponding energy consumption value of the station, graphically represent the station and the energy consumption value that corresponds to the station on a display interface.

After the location information of the station and the corresponding energy consumption value are obtained, in order to enable a user to intuitively see a distribution location of the station and a corresponding energy consumption condition of each station, the station and the corresponding energy consumption value need to be graphically represented to the user through the display interface, and in the embodiment of the present invention, the function is implemented by a net management unit 16. That is, a graphical user interface GUI module is pre-stored in the net management unit 16, and the GUI module intuitively exhibits the obtained distribution location of the station and energy consumption condition according to the geographical location information and the energy consumption value. An exhibition manner may vary according to requirements of the user, and may be, for example, a regional comprehensive energy consumption diagram exhibited in FIG. 5. That is, the stations are divided into multiple different regions according to locations thereof, and a sum of energy consumption values of all stations in the same region undergoes proper weighted calculation and is then used as the corresponding energy consumption value of the region to indicate the energy consumption condition in the region. In addition, it may be understood that, the graphically representation may be that: a modular electronic map is used as a base layer, and at this base layer, each station is marked by dotting and displayed according to the location information, and the energy consumption value corresponding to the station is displayed by being associated with the marked station. The association means that the graphical energy consumption value may be used to cover the graphical station location, or the graphical station and the graphical energy consumption value are displayed at the same time, an association relationship between the graphical station and the graphical energy consumption value may be exhibited through a distance therebetween or through an association symbol.

103: Generate an energy consumption value selection control that is graphical and presented on the display interface, where the energy consumption value selection control is configured to select at least one target energy consumption value or a target energy consumption value range.

In order to enable the graphically represented station and corresponding energy consumption value to be conveniently used to perform corresponding management on the energy consumption value of each station, an energy consumption value selection tool needs to be generated on the graphical display interface. In the embodiment of the present invention, an energy consumption value selection control which is graphical and presented on the display interface is generated, and the energy consumption value selection control selects at least one target energy consumption value or a target energy consumption value range in a drag and drop manner. The target energy consumption value or the target energy consumption value range is selected through the energy consumption value selection control, so as to enable the user to rapidly select the energy consumption value or the energy consumption value range, thereby bringing convenience to the operation and increasing the efficiency. The energy consumption value selection control may be presented at an upper right corner of the display interface, and may be presented at any position on the screen according to preferences and habits of the user. An embodiment of the present invention provides an energy consumption value selection control 10, which performs energy consumption value selection in a drag and drop manner. Through the drag and drop manner, the selection of the energy consumption value can be implemented efficiently, thereby improving the experience of the user.

104: Obtain the at least one target energy consumption value or the target energy consumption value range selected through the energy consumption value selection control, and highlight the graphical station complying with a preset display rule and the graphical energy consumption value that corresponds to the graphical station complying with the preset display rule according to the target energy consumption value or the target energy consumption value range selected by the energy consumption value selection control.

The target energy consumption value or the energy consumption value range is selected through the energy consumption value selection control. The selected energy consumption value or energy consumption value range is used as a critical value triggering the preset display rule. The preset display rule refers to: a range of energy consumption value covered by a minimum value and a maximum value of the energy consumption value selection control is used as a general set, and the selected energy consumption level is used as a critical condition to divide the energy consumption value general set into at least one subset and display the at least one subset. Specifically, in the embodiment of the present invention, when the energy consumption value selection control selects the target energy consumption value, the target energy consumption value is used as the critical value to divide the general set that is formed by the whole energy consumption value range covered by the energy consumption value selection control into a part greater than the critical value, that is, a subset, a part equal to the critical value, that is, another subset, and a part smaller than the critical value, that is, a third subset. After the whole energy consumption value range covered by the energy consumption value selection control is divided by the critical value, that is, the target energy consumption value into multiple subsets, a subset may be selected and displayed, that is, the part greater than the critical value is displayed, or the part equal to the critical value is displayed, or the part smaller than the critical value is displayed; or a combination of the divided subsets may be selected and displayed, that is, the part greater than the critical value and the part equal to the critical value are displayed, or the part smaller than the critical value and the part equal to the critical value are displayed, or the part greater than the critical value and the part smaller than the critical value are selected. The display rule when the energy consumption value selection control selects the target energy consumption value range is similar to the display rule when the target energy consumption value is selected, and is not repeated here for the sake of brevity.

In the station energy consumption management method 100, the geographical location information of the station and the energy consumption value of the station are obtained, and the geographical location information of the station and the energy consumption value of the station are graphically represented on the display interface, so that an administrator can intuitively observe geographical distribution of the station and an energy consumption condition of each station. The energy consumption value selection control for selecting the energy consumption value or the energy consumption value range is generated on the display interface, so that the administrator can rapidly and conveniently select a desired target energy consumption value or target energy consumption value range. After the target energy consumption value or the target energy consumption range is selected, the graphical station complying with a preset display rule and the graphical energy consumption value that corresponds to the graphical station complying with the preset display rule are highlighted, so that the administrator can intuitively select a desired station, and rapidly understand the energy consumption condition corresponding to the station, so as to make energy consumption management of the station convenient.

Figure 6:
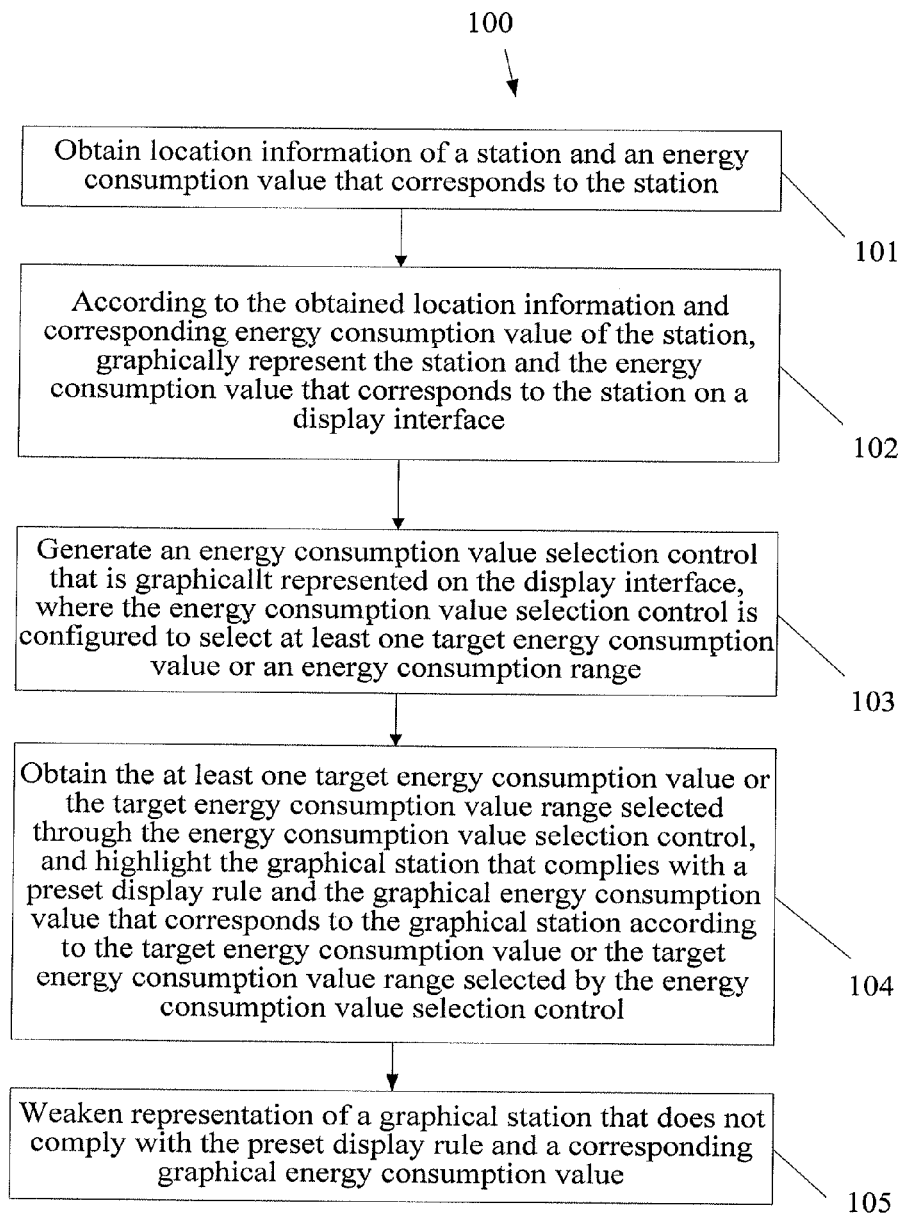
FIG. 6 is a flow chart of another station energy consumption management method according to an embodiment of the present invention.

Further, referring to FIG. 6, at the same time of performing 104 or after performing 104, the station energy consumption management method provided by the embodiment of the present invention further includes:

105: Weaken representation of a graphical station not complying with the preset display rule and a corresponding graphical energy consumption value.

After the graphical station complying with the preset display rule and the energy consumption value that corresponds to the graphical station are highlighted, in order to improve a display effect of the highlighted graphical station and energy consumption value that corresponds to the graphical station, in the embodiment of the present invention, a method for weakening representation of the other graphical stations and the corresponding graphical energy consumption values is provided. Specifically, a contrast between the graphical station not complying with the preset display rule together with the corresponding graphical energy consumption value and a background of the display interface may be decreased, or the graphical station not complying with the preset display rule and the corresponding graphical energy consumption value are hidden.

In the embodiment of the present invention, through the method, the selected station complying with the preset display rule and the corresponding energy consumption state are further highlighted, so that the administrator can manage the selected station conveniently.

Further, in the station energy consumption management method provided by the embodiment of the present invention, a specific implementation manner of 102 may be:

generating a visual station distribution diagram according to the obtained location information of the station.

Figure 7:
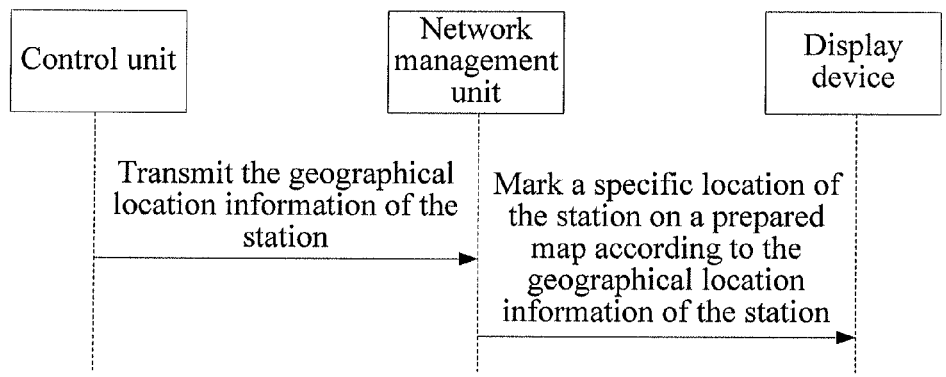
FIG. 7 is a flow chart of graphically representing a station and a corresponding energy consumption value in a station energy consumption management method according to an embodiment of the present invention.

In order to implement the present invention, the visual station distribution diagram needs to be generated first, and a generation manner thereof may be that, pre-modeling is performed on the station according to the location information thereof, so as to form a visual station distribution diagram. During use, a generated visual station distribution diagram model may be directly invoked to visually present a distribution condition of the station to the user. Optionally, the generation of the visual station distribution diagram may be as follows. After the geographical location information (GPS information, having a unique longitude and latitude) of the station is obtained instantly, marking, that is, dotting, is performed on a prepared map (a geographical location distribution diagram) according to the geographical location information, thereby generating the visual geographical location distribution diagram. Specifically, referring to FIG. 7, the control unit 12 in the station transmits the geographical location information of the station to the net management unit 16 through the transmission unit 14, and the net management unit 16 marks a specific location of the station on a prepared map according to the geographical location information of the station, which is displayed through a display apparatus of the net management unit 16.

The obtained energy consumption value corresponding to the station is graphically represented in the visual station distribution diagram, where the graphical station energy consumption value and a geometric position of the corresponding station in the station distribution diagram are associated with each other.

In order to enable the energy consumption value corresponding to the station to be accurately displayed on the visual station distribution diagram, the geographical location information of the station and the energy consumption value are bound, that is, a mapping relationship is established between the geographical location information and the energy consumption value. In the method provided in the embodiment, coordinates of the station in the station distribution diagram are used as display coordinates of the graphical energy consumption value, thereby establishing an association relationship between the graphical station energy consumption value and the geometric position of the corresponding graphical station in the station distribution diagram. The graphical energy consumption value not only may represent the station, but also may indicate the energy consumption value of the station. It may be understood that, the association relationship between the graphical station and the energy consumption value that corresponds to the graphical station may be set according to requirements of the user. For example, the graphical energy consumption value is displayed near the corresponding graphical station, or an association icon, such as a connecting line and an arrow, is generated between the graphical energy consumption value and the corresponding graphical station.

In the method, the visual distribution diagram of the station is generated according to the location information of the station, so that the administrator can locate the station conveniently. Meanwhile, the corresponding graphical energy consumption value of the station is associated with the station with respect to the geometric position, so that the administrator can rapidly understand the energy consumption state of the station.

Further, in the station energy consumption management method provided by the embodiment of the present invention, 103 includes:

associating the energy consumption value selection control with the energy consumption value that corresponds to the station, where a maximum target energy consumption value that is capable of being selected by the energy consumption value selection control is not smaller than an energy consumption value of a station consuming greatest energy, and a minimum target energy consumption value that is capable of being selected by the energy consumption value selection control is not greater than an energy consumption value of a station consuming least energy.

In order to achieve matching between an energy consumption value range covered by the energy consumption value selection control and the energy consumption value of a current graphical station, so as to enable the user to conveniently select and identify stations and the energy consumption values of different stations, in the embodiment of the present invention, the energy consumption value selection control is further associated with the energy consumption value that corresponds to the station, so as to ensure that the maximum target energy consumption value that is capable of being selected by the energy consumption value selection control is not smaller than the energy consumption value of the station consuming the greatest energy and the minimum target energy consumption value that is capable of being selected by the energy consumption value selection control is not greater than the energy consumption value of the station consuming the least energy.

In the method, the energy consumption value selection control is associated with the energy consumption value that corresponds to the station, so that a value selection range of the energy consumption value selection control can match the current energy consumption value corresponding to the station, and the administrator can precisely select the target energy consumption value.

Specifically, in the station energy consumption management method provided by the embodiment of the present invention, the generating the energy consumption value selection control that is graphical and presented on the display interface in 103 includes:

generating a graphical ruler that takes the energy consumption value as a scale, and generating at least one graphical vernier capable of moving along the graphical ruler to select the target energy consumption value or the target energy consumption value range.

Figure 8:
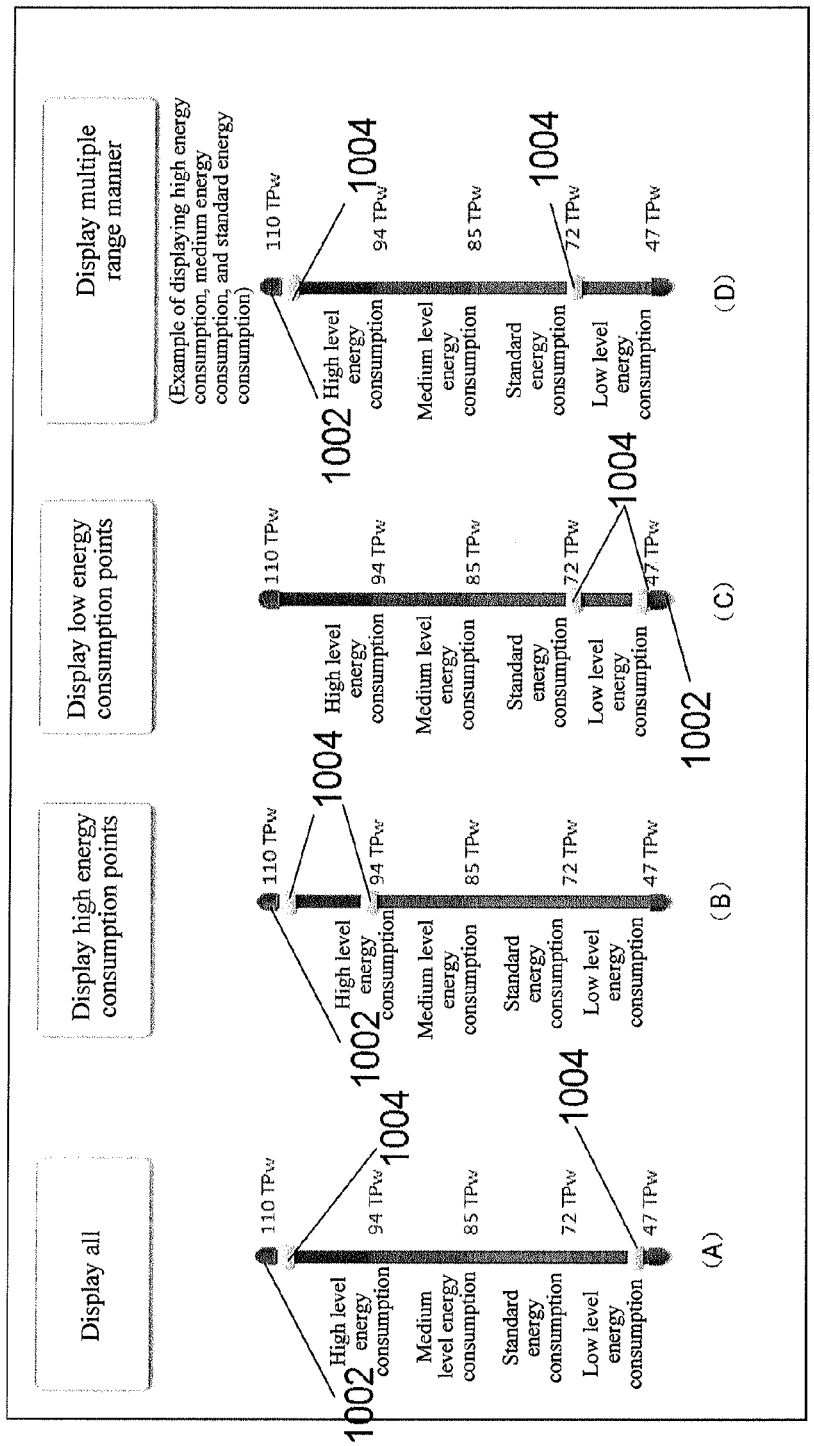
FIG. 8 is an exhibitive diagram of generating an energy consumption value selection control and using the energy consumption value selection control according to a station energy consumption management method provided by an embodiment of the present invention.

In the method, the net management unit 16 may generate, through a GUI module, the ruler indicating the energy consumption value, and generate at least one vernier that is also called slider and capable of moving along the energy consumption value ruler. A currently selected target energy consumption value is determined according to a reading of the ruler that corresponds to the vernier or slider. Specifically, referring to FIG. 8, FIG. 8 exhibits the graphical energy consumption value selection control that is generated through the GUI module and provided by the embodiment of the present invention. The graphical energy consumption value control includes a graphical ruler 1002 that takes the energy consumption value as a scale and two verniers/sliders 1004 capable of moving along the graphical ruler 1002. The verniers/sliders 1004 are configured to move along the graphical ruler 1002 to select a corresponding target energy consumption value or target energy consumption value range. In FIG. 8, multiple states are shown in sequence from A to D, in which the target energy consumption value range is selected through the two verniers/sliders 1006.

In the method, the energy consumption value selection control is set as the ruler that takes the energy consumption value as a scale, and the vernier that is capable of moving along the graphical ruler is generated for a user to select the target energy consumption value, which complies with a use habit of the user, intuitively reflects a function of the energy consumption value selection control, saves a process in which the user is required to learn the function of the energy consumption value selection control, and is convenient for use.

Figure 9:
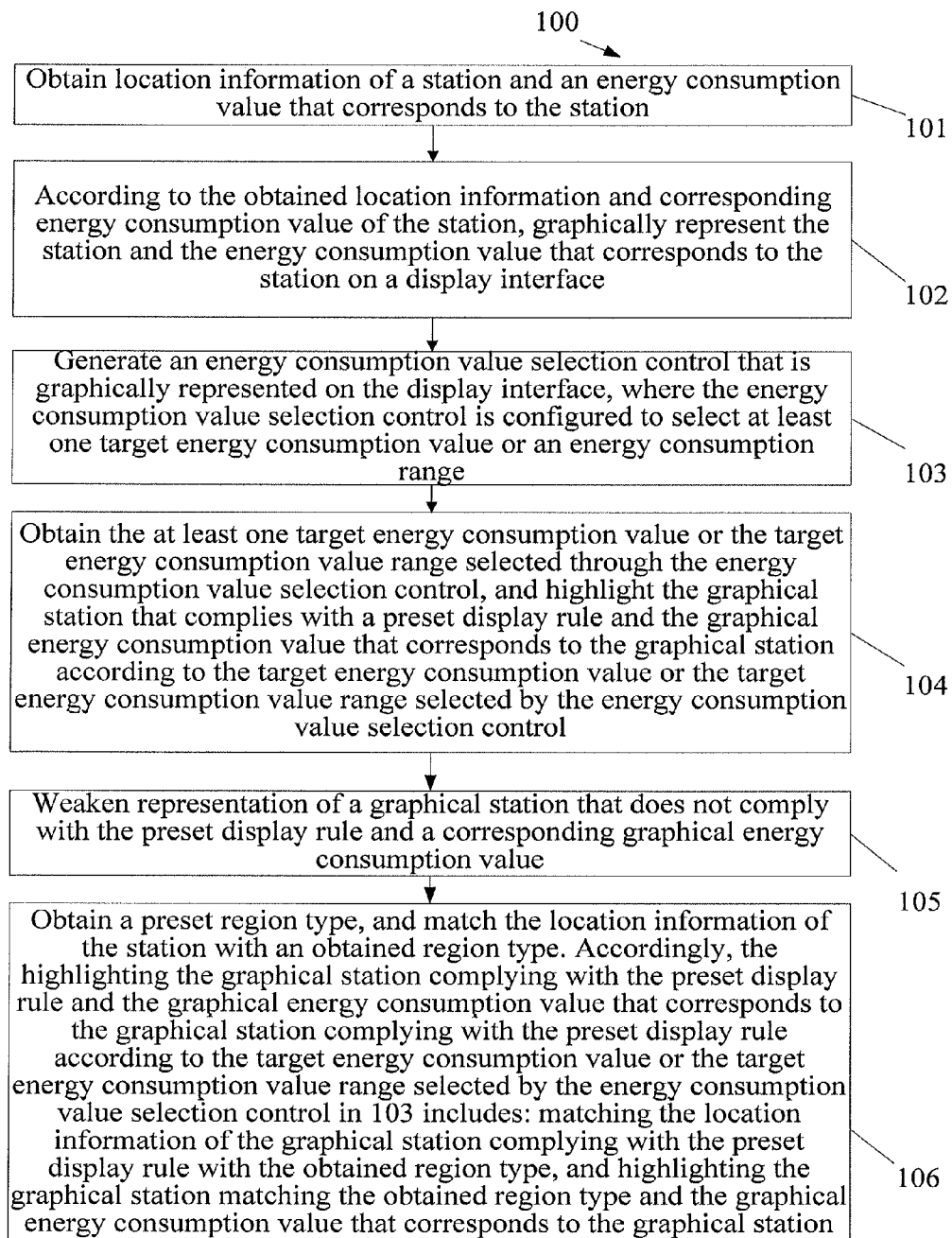
FIG. 9 is a flow chart of another station energy consumption management method according to an embodiment of the present invention.

Further, referring to FIG. 9, the station energy consumption management method provided by the embodiment of the present invention further includes:

106: Obtain a preset region type, and match the location information of the station with an obtained region type. Accordingly, the highlighting the graphical station complying with the preset display rule and the graphical energy consumption value that corresponds to the graphical station complying with the preset display rule according to the target energy consumption value or the target energy consumption value range selected by the energy consumption value selection control in 103 includes:

matching the location information of the graphical station complying with the preset display rule with the obtained region type, and highlighting the graphical station matching the obtained region type and the graphical energy consumption value that corresponds to the graphical station.

In order to enable the user to select a desired station according to different scenarios of station energy consumption management, the different scenarios refer to regions or occasions in which station loads are obviously different. For example, the load of a station changes obviously as the number of users in different geographical locations changes. Specifically, the loads of stations in the mountainous areas, forest areas, and villages are light, but the loads of the stations in towns and cities are heavy. More specifically, the loads of stations along routes of high-speed railways and in colleges and stadiums are heavy, and accordingly the loads of stations in other functional regions are lighter. According to the law, the regions covered by stations may be divided into multiple different region types, and each of the different region types includes a location information range thereof. When it is required to obtain a station in a region type and an energy consumption value that corresponds to the station, the location information range covered by the obtained region type is matched with the location information of the station. Specifically, it may be that, the location information covered by the obtained region type is a closed region defined by a longitude and latitude range, and during matching, the longitude and latitude of the station is compared with a longitude range and a latitude range of the selected region type. If the longitude and the latitude of the station fall within the longitude range and the latitude range of the selected region type, the matching is considered successful; otherwise, the matching is considered unsuccessful. Optionally, a preset region type may also be applied to the station according to the geographical location information thereof. That is, a relationship of mutual association or mapping is established between the geographical location information of the station and the region type. Under the relationship of mutual association or mutual mapping, the corresponding region type may be found through the geographical location information of the station, and the corresponding geographical location information may be found through the region type. Based on this, matching is performed on the location information of the station and the obtained region type. If a matching result is the same as the preset mapping relationship or association relationship, the matching is considered successful; otherwise, the matching is considered unsuccessful. After the location information of the station is matched with the obtained region type, the successfully matched graphical station and the graphical energy consumption value that corresponds to the graphical station are highlighted, and representation of the other graphical stations that are not successfully matched and the corresponding graphical energy consumption values are weakened.

Accordingly, based on step 106, the station energy consumption management method provided by the embodiment of the present invention further includes: weakening representation of the graphical station and the graphical energy consumption value that corresponds to the station, where the graphical station is among the graphical stations complying with the preset display rule and does not match the obtained region type.

In the method, the user is allowed to obtain, according to the preset region type, the station complying with region type characteristics, so as to combine the selection of the target energy consumption value to select the station from a two-dimensional perspective, thereby further facilitating the use by the administrator and improving the experience of the user.

Figure 10:
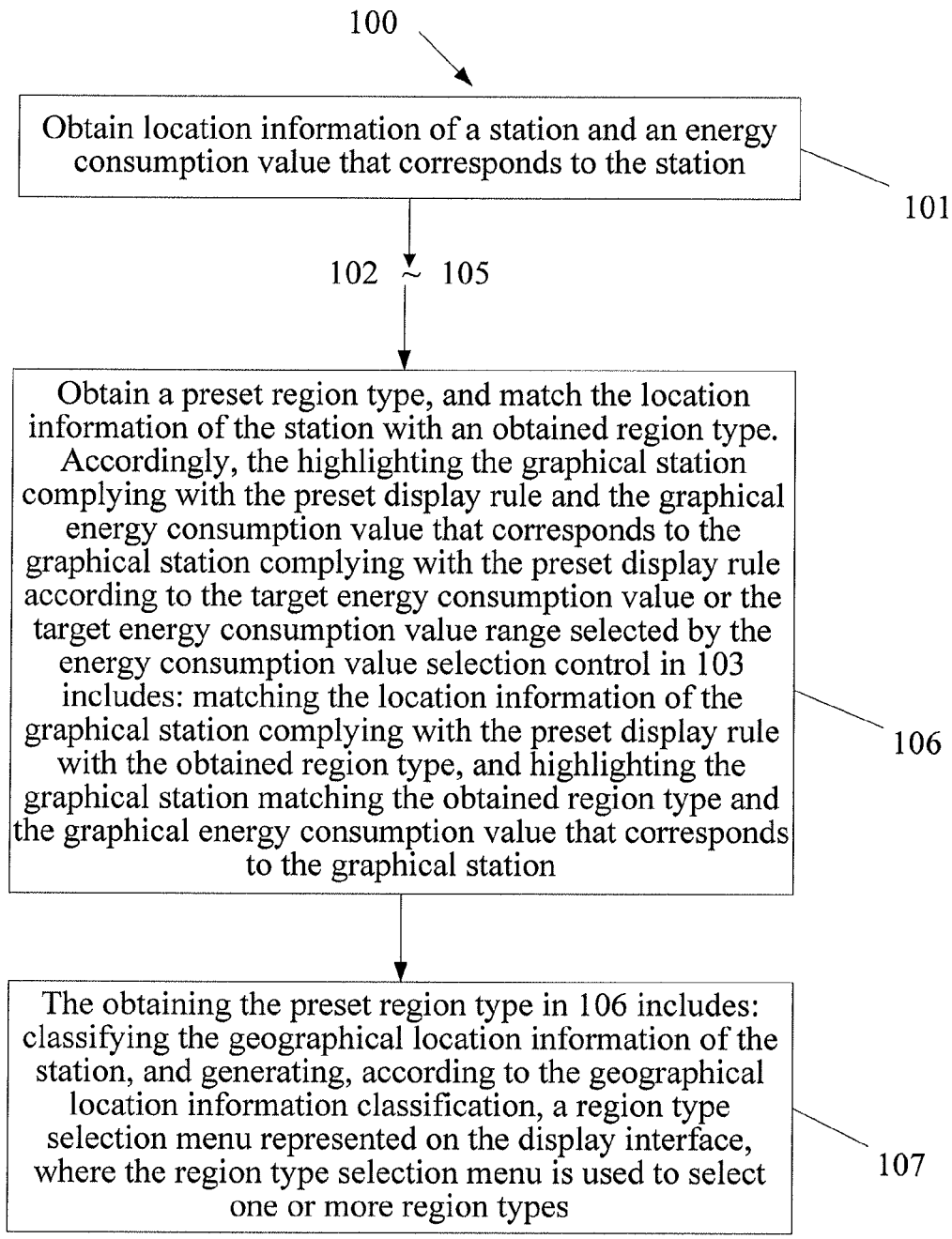
FIG. 10 is a flow chart of another station energy consumption management method according to an embodiment of the present invention.

Optionally, referring to FIG. 10, in the station energy consumption management method provided by the embodiment of the present invention, the obtaining the preset region type in 106 includes:

107: Classify the geographical location information of the station, and generate, according to the geographical location information classification, a region type selection menu represented on the display interface, where the region type selection menu is used to select one or more region types.

In order to enable the user to select a desired station according to different scenarios of station energy consumption management, the different scenarios refer to regions or occasions in which station loads are obviously different. For example, the load of a station changes obviously as the geographical location changes. Specifically, the loads of the stations in the mountainous areas, forest areas, and villages are light, but the loads of the stations in towns and cities are heavy. More specifically, the loads of stations along routes of high-speed railways and in colleges and stadiums are heavy, and accordingly the loads of stations in other functional regions are lighter. According to the law, the regions covered by stations may be divided into multiple different region types, and each of the different region types includes a location information range thereof. When a station in a region type and an energy consumption value that corresponds to the station need to be obtained, the location information range covered by the obtained region type is matched with the location information of the station. Specifically, it may be that, a relationship of mutual association or mapping is established between the geographical location information of the station and the region type. Under the relationship of mutual association or mutual mapping, the corresponding region type may be found through the geographical location information of the station, and the corresponding geographical location information may also be found through the region type. Based on this, matching is performed on the location information of the station and the obtained region type. If a matching result is the same as the preset mapping relationship or association relationship, the matching is considered successful; otherwise, the matching is considered unsuccessful After the location information of the station is matched with the obtained region type, the successfully matched graphical station and the graphical energy consumption value that corresponds to the graphical station are highlighted, and representation of the other graphical stations not successfully matched and the graphical energy consumption values are weakened.

In the method, the user is allowed to associate the geographical location information of the station with the region type, so as to combine the selection of the target energy consumption value to select the station from a two-dimensional perspective, thereby further facilitating the use by the administrator and improving the experience of the user.

Further, in the station energy consumption management method provided by the embodiment of the present invention, 103 further includes:

rating the energy consumption of the station according to the corresponding energy consumption value of the station, and applying different visual elements to stations of different energy consumption levels.

In order to intuitively display an energy consumption condition of the station, in the embodiment of the present invention, the stations may be rated according to specific energy consumption values thereof. That is, the energy consumption of the stations is divided into multiple energy consumption levels according to a hierarchical manner. In order to facilitate identification of different energy consumption levels, in the embodiment of the present invention, different visual elements are applied to the different energy consumption levels. The visual elements may be set according to preferences or requirements of the user. For example, the visual elements may be colors, shapes, sizes or combinations of various visual elements. Specifically, in the embodiment of the present invention, colors are used as the visual elements to be applied to different energy consumption levels. For a specific scheme, reference may be made to Table 1.

TABLE 1

| Total power consumption (Kw/h standard 6TRX) | Icon color | RGB | Energy consumption state |
|---|---|---|---|
| 4000 < TPw <= 3000 | Red | R255/G30/B0 | High |
| 3000 < TPw <= 2500 | Yellow | R255/G216/B0 | Medium |

TABLE 1-continued

| Total power consumption (Kw/h standard 6TRX) | Icon color | RGB | Energy consumption state |
|---|---|---|---|
| 2500 < TPw <= 1500 | Blue | R0/G73/B255 | Normal |
| 1500 < TPw <= 1000 | Green | R131/G183/B24 | Low |

It can be intuitively seen from Table 1 that, the energy consumption value of the station ranging from 1000 TPw to 4000 TPw is divided into four different levels. Energy consumption states corresponding to the four different levels are in sequence in an ascending order. Different colors are applied to different energy consumption levels. For example, when the energy consumption value satisfies 1500<TPw<=1000, green is used as the visual element to be applied to the graphical energy consumption value that corresponds to the corresponding graphical station. For energy consumption values of other different energy consumption states, colors such as blue, yellow and red are used as visual elements to be applied to the graphical energy consumption values that correspond to the corresponding graphical stations. For the net management unit 16, the net management unit 16 controls user visible chromatic performance of the graphical energy consumption values corresponding to the graphical stations of different energy consumption levels according to a ratio of RGB, the three primary colors.

In the method, applying different visual elements to stations of different energy consumption levels may further improve identifiability of the energy consumption condition, so that the administrator can rapidly identify the energy consumption label of each station, thereby determining the energy consumption state of each station.

Figure 11:
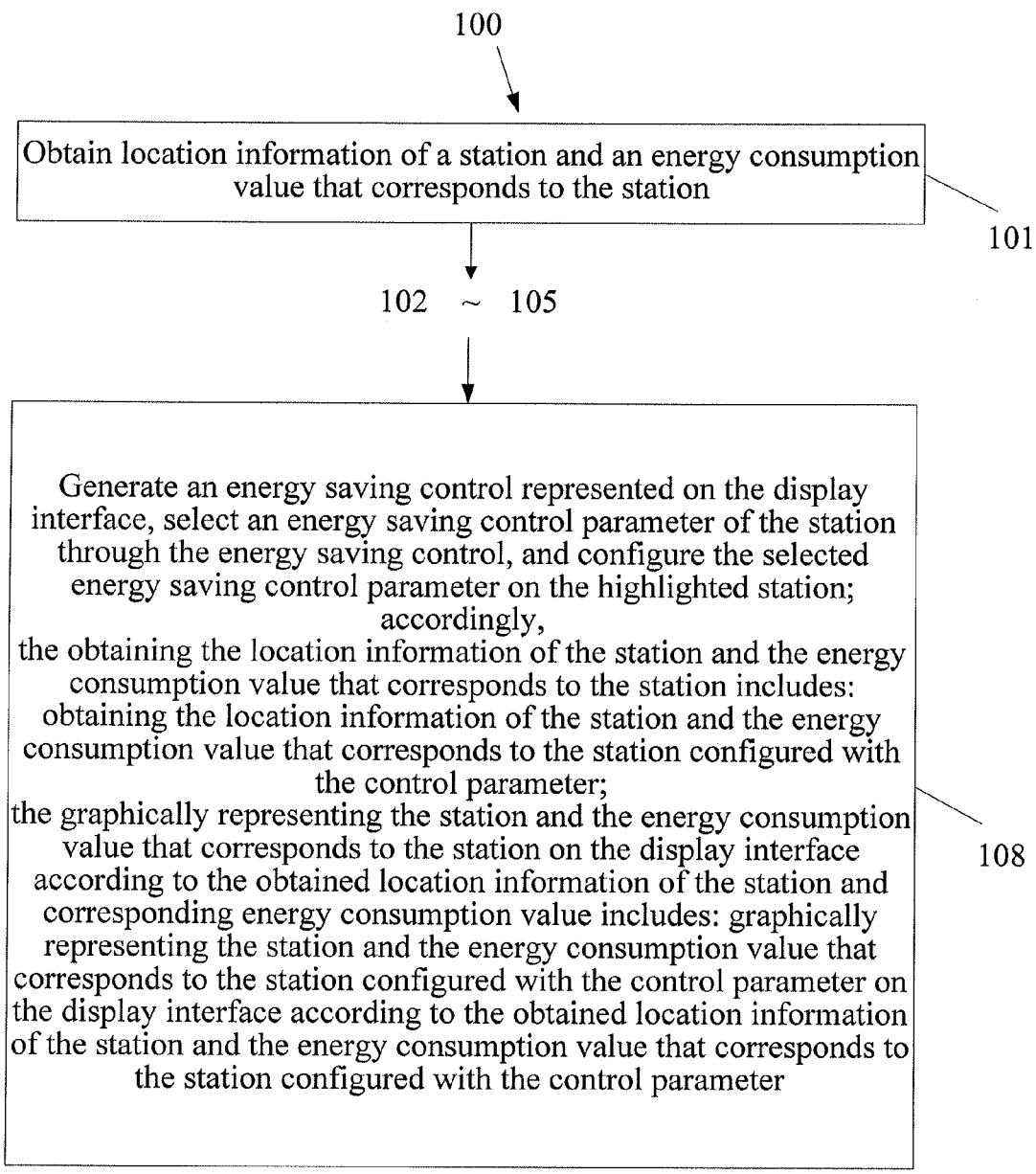
FIG. 11 is a flow chart of another station energy consumption management method according to an embodiment of the present invention.

Further, referring to FIG. 11, the station energy consumption management method provided by the embodiment of the present invention further includes:

108: Generate an energy saving control represented on the display interface, select an energy saving control parameter of the station through the energy saving control, and configure the selected energy saving control parameter on the highlighted station. Accordingly, The obtaining the location information of the station and the energy consumption value that corresponds to the station includes: obtaining the location information of the station and the energy consumption value that corresponds to the station configured with the control parameter.

The graphically representing the station and the energy consumption value that corresponds to the station on the display interface according to the obtained location information of the station and corresponding energy consumption value includes: graphically representing the station and the energy consumption value that corresponds to the station configured with the control parameter on the display interface according to the obtained location information of the station and the energy consumption value that corresponds to the station configured with the control parameter.

In order to achieve the objective of energy saving, an embodiment of the present invention further provides an energy saving management method. Specifically, the net management unit 16 may generate an energy saving control, and various energy consumption parameters of the station may be effectively selected and set through the energy saving control. After being selected through the energy saving control, a specific energy saving control parameter is sent to the station through the transmission unit 14, and the management unit 12 in the station configures the energy saving control parameter to each load in the station, thereby achieving energy saving management of each station. After the energy saving control parameter is configured to each station, an energy consumption value corresponding to the station configured with the control parameter may be obtained to update the corresponding graphical energy consumption value of each station under the new energy saving control parameter, so as to intuitively observe the energy consumption condition of each station after the energy saving control is performed.

In the method, the energy saving control parameter may be selected through the energy saving control represented on the display interface, and the selected energy saving control parameter is configured on each highlighted station, that is, the selected station, and the station may adjust a working state or an operation mode thereof according to the energy saving control parameter to achieve the objective of energy saving. Meanwhile, after the energy saving control parameter is configured to the station and the station adjusts the working state according to the control parameter, a current energy consumption state of the station is fed back instantly, and the graphical energy consumption value of the station is updated, so that the user can intuitively know the energy consumption state of the station after the energy saving control in time.

An embodiment of the present invention further provides a station energy consumption presentation method, which includes:

displaying, through a display interface, stations in different geographical locations and energy consumption labels that correspond to the stations, where the energy consumption labels are used to indicate energy consumption levels of the stations;

generating an energy consumption value selection control on the display interface displaying the stations and the energy consumption labels of the stations, where the energy consumption value selection control is configured to select an energy consumption level or an energy consumption level range; and highlighting a station complying with a preset display rule and the energy consumption label that corresponds to the station according to the energy consumption level or the energy consumption level range selected by the energy consumption value selection control.

In the station energy consumption presentation method, the stations in the different geographical locations and the energy consumption labels that correspond to the stations are displayed on the display interface, so that an administrator can intuitively observe geographical distribution of the stations and an energy consumption condition of each station. The energy consumption value selection control that is configured to select the energy consumption level of the station is generated on the display interface, so that the administrator can select the corresponding energy consumption level or energy consumption level range through the energy consumption value selection control. After the energy consumption level or the energy consumption level range is selected, the graphical station complying with the preset display rule and the graphical energy consumption value that corresponds to the graphical station complying with the preset display rule are highlighted through the method by using the selected energy consumption level or energy consumption level range, so that the administrator can rapidly find a desired station to perform following processing.

Further, in the station energy consumption presentation method provided by the embodiment of the present invention, when the station complying with the preset display rule and the energy consumption label that corresponds to the station are highlighted according to the current energy consumption level selected by the energy consumption value selection control, the method further includes:

weakening representation of a station not complying with the preset display rule and the energy consumption label that corresponds to the station.

In the embodiment of the present invention, through the method further, the selected station complying with the preset display rule and the corresponding energy consumption state are highlighted, so that the administrator can manage the selected station conveniently.

Further, the station energy consumption presentation method provided by the embodiment of the present invention further includes: if the stations correspond to multiple different energy consumption levels, applying different visual elements to energy consumption labels of the stations that belong to the different energy consumption levels.

In the method, applying different visual elements to stations of different energy consumption levels can further improve identifiability of the energy consumption condition, so that the administrator can rapidly identify the energy consumption label of each station, thereby determining the energy consumption state of each station.

Further, the station energy consumption presentation method provided by the embodiment of the present invention further includes:

generating a region type selection menu represented on the display interface, where the region type of the station is associated with the region type in the region type selection menu.

The highlighting the station complying with the preset display rule and the energy consumption label that corresponds to the station according to the energy consumption level selected by the energy consumption value selection control includes: when one or more region types in the region type selection menu is selected, highlighting a station and the energy consumption label that corresponds to the station, where the station matches the selected region type and complies with the preset display rule.

Based on the foregoing method, the station energy consumption presentation method provided by the embodiment of the present invention further includes: weakening representation of a station and the energy consumption label that corresponds to the station, where the station complies with the preset display rule but does not match the selected region type.

According to the foregoing method, the user is allowed to associate the geographical location information of the station with the region type, so as to combine the selection of the target energy consumption value to select the station from a two-dimensional perspective, thereby further facilitating the use by the administrator and improving the experience of the user.

Further, the station energy consumption presentation method provided by the embodiment of the present invention further includes:

generating an energy saving control represented on the display interface, where the energy saving control is configured to select an energy saving control parameter of the station; after the energy saving control parameter selected by the energy saving control is configured on the highlighted station, accordingly, the displaying, through the display interface, the stations in the different geographical locations and the energy consumption labels that correspond to the stations where the energy consumption labels are used to indicate the energy consumption levels of the stations includes: displaying, through the display interface, the stations in the different geographical locations and the energy consumption label that corresponds to the station configured with the energy saving control parameter, where the energy consumption label is used to indicate an energy consumption level of the station.

In the method, the energy saving control parameter may be selected through the energy saving control represented on the display interface, and the selected energy saving control parameter is configured on each highlighted station, that is, the selected station, and the station may adjust a working state or an operation mode thereof according to the energy saving control parameter to achieve the objective of energy saving. Meanwhile, after the energy saving control parameter is configured to the station and the station adjusts the working state according to the control parameter, a current energy consumption state of the station is fed back instantly, and the graphical energy consumption value of the station is updated, so that the user can intuitively know the energy consumption state of the station after the energy saving control in time.

Further, in the station energy consumption presentation method provided by the embodiment of the present invention, positions of the energy consumption value selection control, the region type selection menu, the energy saving mode selection menu, the stations, and the energy consumption labels on the display interface do not interfere with each other.

In the method, in a process of station energy consumption presentation, the energy consumption value selection control, the region type selection menu, the energy saving mode selection menu, the stations, and the energy consumption labels are staggered, thereby highlighting the stations and the energy consumption labels to bring convenience to viewing by the administrator.

Figure 12:
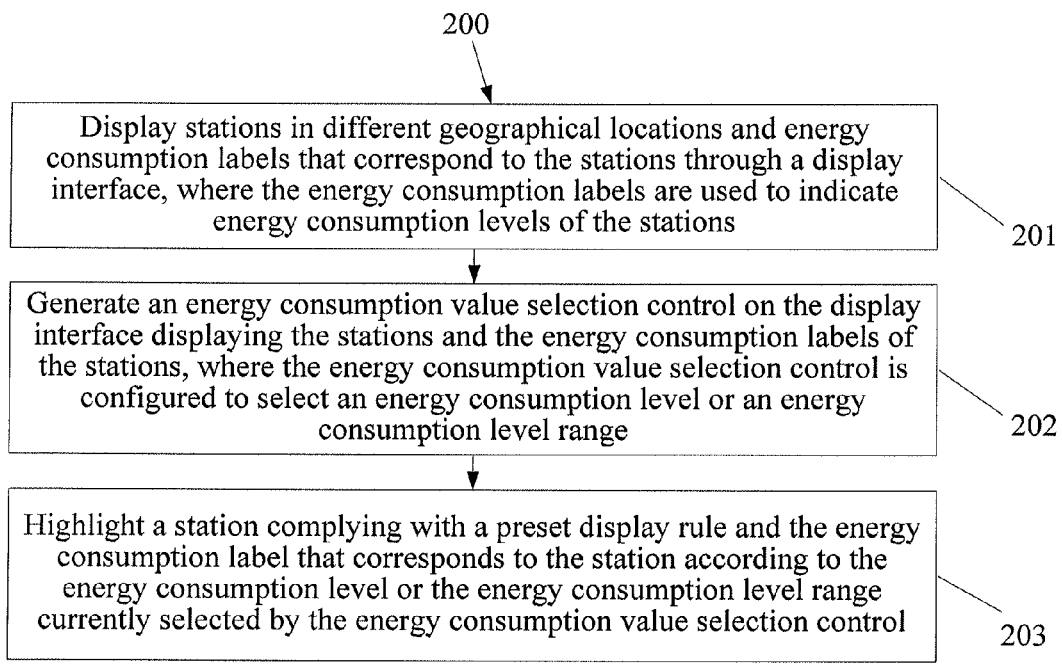
FIG. 12 is a flow chart of a station energy consumption presentation method according to an embodiment of the present invention.

Referring to FIG. 12, a station energy consumption presentation method 200 provided by an embodiment of the present invention includes:

201: Display stations in different geographical locations and energy consumption labels that correspond to the stations through a display interface, where the energy consumption labels are used to indicate energy consumption levels of the stations.

In order to enable a user to intuitively see distribution locations of the stations and a corresponding energy consumption condition of each of the stations, the stations and the corresponding energy consumption values thereof are presented by a display interface. The stations and the corresponding energy consumption labels thereof are displayed in different positions on the display interface accordingly according to different geographical locations thereof. In the embodiment of the present invention, the function is implemented through the net management unit 16. That is, a graphical user interface GUI module is pre-stored in the net management unit 16, and the GUI module intuitively exhibits the station and the corresponding energy consumption label thereof to the user according to the pre-obtained or pre-stored geographical location information of the station and energy consumption information of the station. The energy label and the graphical station are associated with each other, an association manner of which may be that indication may be achieved through closeness with respect to the location, or visual elements of the same shape or the same color may be used for association, or an association symbol may be set for implementation. In the embodiment of the present invention, a solid round dot is disposed at the position where the station is located to represent the station and the energy consumption value that corresponds to the station at the same time.

202: Generate an energy consumption value selection control on the display interface displaying the stations and the energy consumption labels of the stations, where the energy consumption value selection control is configured to select an energy consumption level or an energy consumption level range.

After the station and the corresponding energy consumption value are graphically represented, in order to enable the user to rapidly and conveniently find an operating control that is capable of filtering the station according to the energy consumption value, the embodiment of the present invention provides an energy consumption value selection control 1706 displayed on the display interface displaying the station and the station energy consumption label. The energy consumption value selection control 1706 is configured to select at least one current energy consumption level or an energy consumption level range. The current energy consumption level or energy consumption level range is selected through the energy consumption value selection control 1706, which may enable the user to rapidly select the energy consumption level or the energy consumption level range, thereby facilitating operation and increasing the efficiency. The energy consumption value selection control may be presented at an upper right corner of the display interface, or may be presented at any position on the screen according to preferences and habits of the user.

203: Highlight a station complying with a preset display rule and the energy consumption label that corresponds to the station according to the energy consumption level or the energy consumption level range currently selected by the energy consumption value selection control.

When the energy consumption value selection control selects an energy consumption level or an energy consumption level range, the selected energy consumption level or energy consumption level range is used as a critical value triggering the preset display rule. The preset display rule refers to that, a range of energy consumption level covered by a minimum value and a maximum value of the energy consumption value selection control is used as a general set, and the selected energy consumption level or energy consumption level range is used as a critical value to divide the energy consumption value general set into at least one subset and display the at least one subset. Specifically, in the embodiment of the present invention, when the energy consumption value selection control selects a current energy consumption level, the current energy consumption level is used as the critical value to divide the general set that is formed by the whole energy consumption level range covered by the energy consumption value selection control into a part greater than the critical value, that is, a subset, a part equal to the critical value, that is, another subset, and a part smaller than the critical value, that is, a third subset. After the whole energy consumption level range covered by the energy consumption value selection control is divided by the critical value, that is, the current energy consumption level into multiple subsets, a subset may be selected and displayed, that is, the part greater than the critical value is displayed, or the part equal to the critical value is displayed, or the part smaller than the critical value is displayed; or a combination of the divided subsets may be selected and displayed, that is, the part greater than the critical value and the part equal to the critical value are displayed, or the part smaller than the critical value and the part equal to the critical value are displayed, or the part greater than the critical value and the part smaller than the critical value are selected. The display rule when the energy consumption value selection control selects an energy consumption level range is similar to the display rule when the current energy consumption level is selected, and is not repeated here for the sake of brevity.

In the station energy consumption presentation method, the stations in the different geographical locations and the energy consumption labels that correspond to the stations are displayed on the display interface, so that an administrator can intuitively observe geographical distribution of the stations and an energy consumption condition of each station. The energy consumption value selection control that is configured to select the energy consumption level of the station is generated on the display interface, so that the administrator can select the corresponding energy consumption level through the energy consumption value selection control. After the energy consumption level or the energy consumption level range is selected, the graphical station complying with the preset display rule and the graphical energy consumption value that corresponds to the graphical station complying with the preset display rule are highlighted through the method, so that the administrator can rapidly find a desired station to perform following processing.

Figure 13:
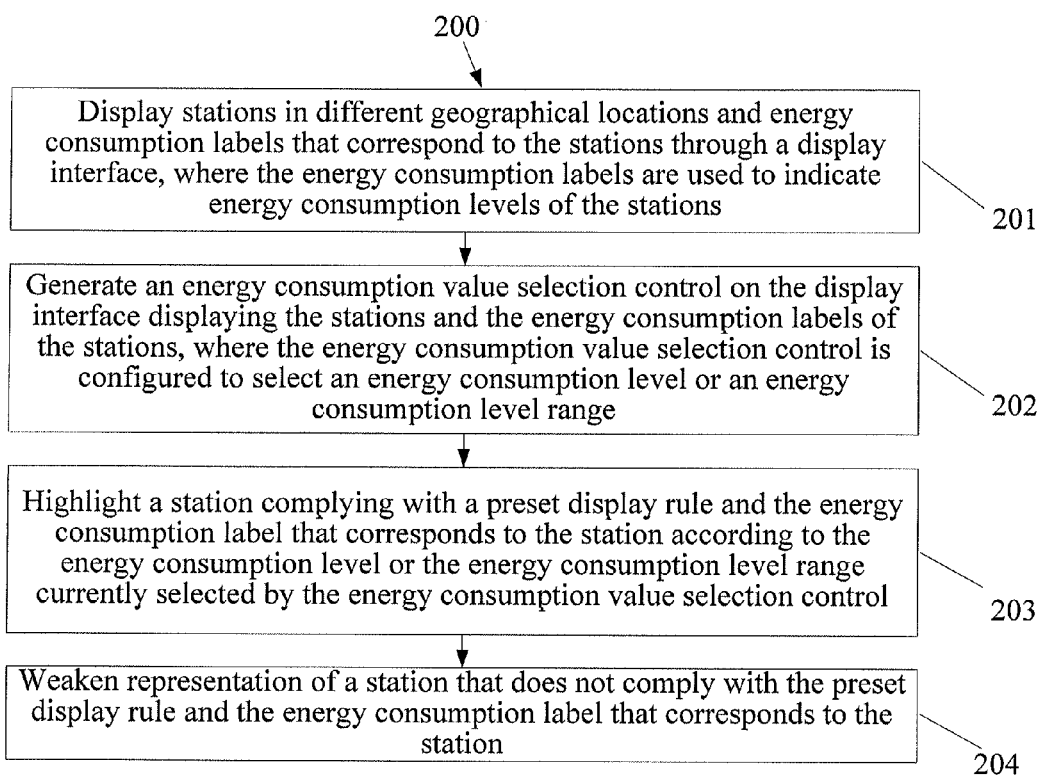
FIG. 13 is a flow chart of another station energy consumption presentation method according to an embodiment of the present invention.

Further, referring to FIG. 13, in the station energy consumption presentation method provided by the embodiment of the present invention, after the method 203, the method further includes:

204: Weaken representation of a station not complying with the preset display rule and the energy consumption label that corresponds to the station.

After the station complying with the preset display rule and the energy consumption value are highlighted, in order to improve a display effect of the highlighted selected station and corresponding energy consumption value, in the embodiment of the present invention, a contrast between a station not complying with the preset display rule together with a corresponding energy consumption label and a background of the display interface is decreased, or the station not complying with the preset display rule and the corresponding energy consumption label are hidden. In the embodiment of the present invention, through the method, the selected station complying with the preset display rule and the corresponding energy consumption state are further highlighted, so that the administrator can manage the selected station conveniently.

Further, the station energy consumption presentation method provided by the embodiment of the present invention further includes:

if the stations correspond to multiple different energy consumption levels, applying different visual elements to energy consumption labels of the stations that belong to the different energy consumption levels.

In the embodiment of the present invention, different visual elements are applied to different energy consumption levels. The visual elements may be set according to preferences or requirements of the user. For example, the visual elements may be colors, shapes, sizes or combinations of various visual elements. Specifically, in the embodiment of the present invention, colors are used as the visual elements to be applied to different energy consumption levels. For a specific scheme, reference may be made to Table 2.

TABLE 2

| Total power consumption (Kw/h standard 6TRX) | Icon color | RGB | Energy consumption state |
|---|---|---|---|
| 4000 < TPw <= 3000 | Red | R255/G30/B0 | High |
| 3000 < TPw <= 2500 | Yellow | R255/G216/B0 | Medium |
| 2500 < TPw <= 1500 | Blue | R0/G73/B255 | Normal |
| 1500 < TPw <= 1000 | Green | R131/G183/B24 | Low |

It can be intuitively seen from Table 2 that, the energy consumption value of the station ranging from 1000 TPw to 4000 TPw is divided into four different levels. Energy consumption states corresponding to the four different levels are in sequence in an ascending order. Different colors are applied to different energy consumption levels. For example, when the energy consumption value satisfies 1500<TPw<=1000, green is used as the visual element to be applied to the graphical energy consumption value that corresponds to the corresponding graphical station. For energy consumption values of other different energy consumption states, colors such as blue, yellow and red are used as visual elements to be applied to the graphical energy consumption values corresponding to the corresponding graphical stations. For the net management unit 16, the net management unit 16 controls user visible chromatic performance of the graphical energy consumption values corresponding to the graphical stations of different energy consumption levels according to a ratio of RGB, the three primary colors.

In the method, applying different visual elements to stations of different energy consumption levels may further improve identifiability of the energy consumption condition, so that the administrator can rapidly identify the energy consumption label of each station, thereby determining the energy consumption state of each station.

Figure 14:
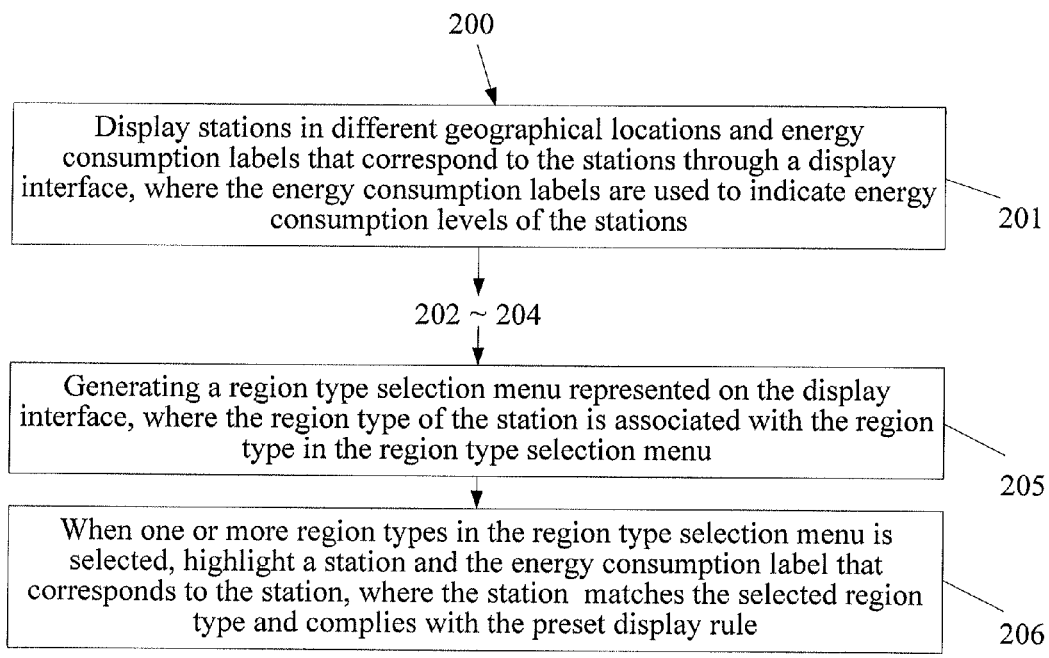
FIG. 14 is a flow chart of another station energy consumption presentation method according to an embodiment of the present invention.

Further, referring to FIG. 14, the station energy consumption presentation method provided by the embodiment of the present invention further includes:

205: Generate a region type selection menu represented on the display interface, where the region type of the station is associated with the region type in the region type selection menu.

In order to enable the user to select a desired station according to different scenarios of station energy consumption management, the different scenarios refer to regions or occasions in which station loads are obviously different. For example, the load of a station changes obviously as the geographical location changes. Specifically, the loads of stations in mountainous areas, forest areas, and villages are light, but the loads of the stations in towns and cities are heavy. More specifically, the loads of stations along routes of high-speed railways and in colleges and stadiums are heavy, and accordingly the loads of stations in other functional regions are lighter. Stations of different region types vary in the power consumption condition, overall condition and management method, so that the demand of selecting stations under different region types exists, and a region type selection menu that is provided by the embodiment of the present invention and displayed on the display interface can meet the demand. According to the law that the stations in different region types are different in the over power consumption, the regions covered by the stations may be associated with various region types in the region type selection menu. That is, a mapping relationship is established between the geographical location information of the station and the region type. Under the mapping relationship, the corresponding region type may be found through the geographical location information of the station, and the corresponding geographical location information may also be found through the region type.

206: When one or more region types in the region type selection menu is selected, highlight a station and the energy consumption label that corresponds to the station, where the station matches the selected region type and complies with the preset display rule.

When it required to obtain a station in a region type and an energy consumption label that corresponds to the station, the station associated with the selected region type and the energy consumption label that corresponds to the station are identified according to the association relationship, and the identified station and the energy consumption label that corresponds to the station are highlighted, where the station complies with the preset display rule.

Based on 206, the station energy consumption presentation method provided by the embodiment of the present invention further includes: weakening representation of a station and the energy consumption label that corresponds to the station, where the station complies with the preset display rule but does not match the selected region type.

In the method, the user is allowed to associate the geographical location information of the station with the region type, so as to combine the selection of the target energy consumption value to select the station from a two-dimensional perspective, thereby further facilitating the use by the administrator and improving the experience of the user.

Figure 15:
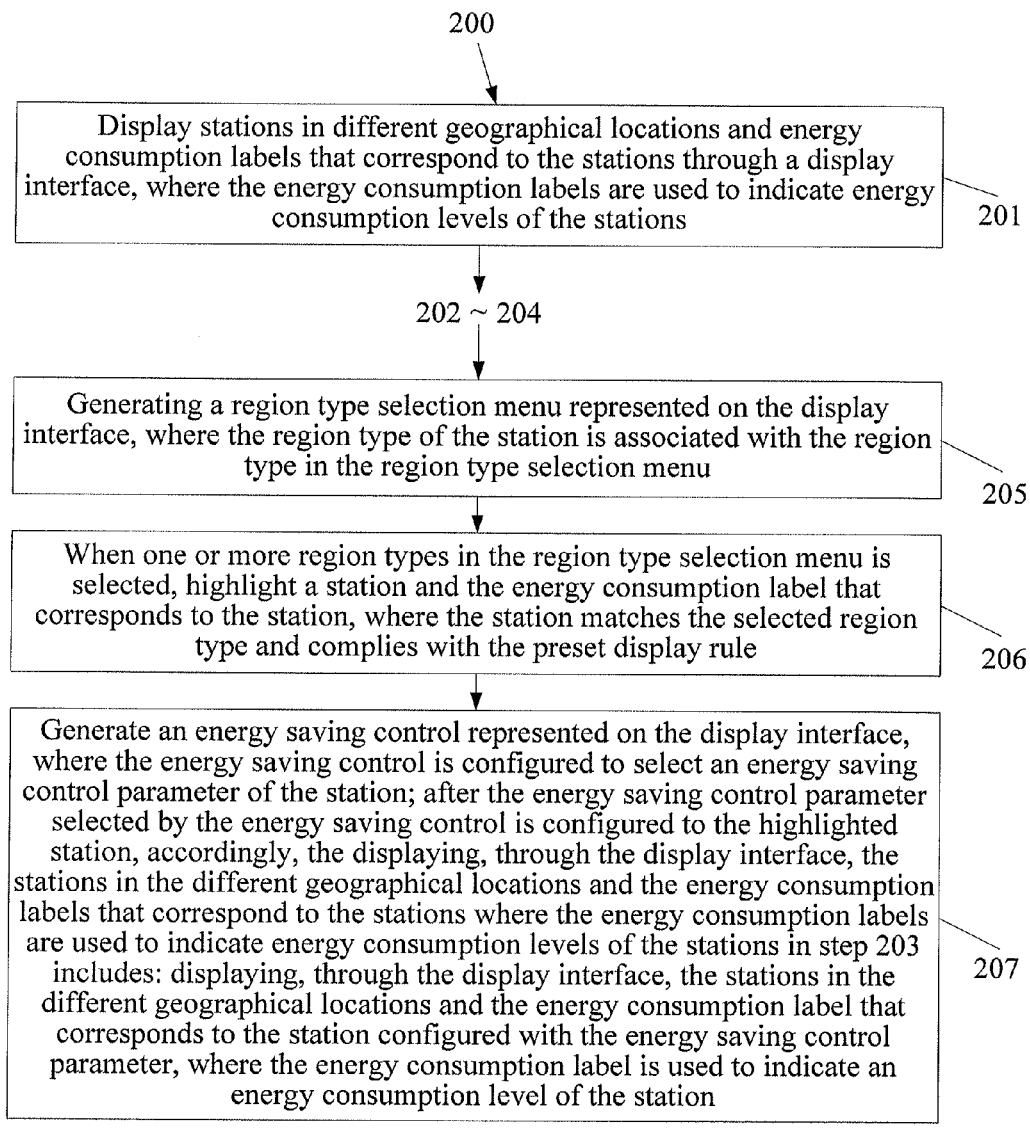
FIG. 15 is a flow chart of another station energy consumption presentation method according to an embodiment of the present invention.

Further, referring to FIG. 15, the station energy consumption presentation method provided by the embodiment of the present invention further includes:

207: Generate an energy saving control represented on the display interface, where the energy saving control is configured to select an energy saving control parameter of the station; after the energy saving control parameter selected by the energy saving control is configured on the highlighted station, accordingly, the displaying, through the display interface, the stations in the different geographical locations and the energy consumption labels that correspond to the stations where the energy consumption labels are used to indicate the energy consumption levels of the stations in step 203 includes: displaying, through the display interface, the stations in the different geographical locations and the energy consumption label that corresponds to the station configured with the energy saving control parameter, where the energy consumption label is used to indicate an energy consumption level of the station.

In order to achieve the objective of energy saving, the embodiment of the present invention may further provide an energy saving control represented on the display interface. Specifically, the net management unit 16 may generate an energy saving control. The energy saving control is presented on the display interface displaying the station and the energy consumption label that corresponds to the station. Various energy consumption parameters of the station may be effectively selected and set through the energy saving control. After being selected through the energy saving control, a specific energy saving control parameter is sent to the station through the transmission unit 14, and the management unit 12 in the station configures the energy saving control parameter to each load in the station, thereby achieving energy saving management of each station.

In the method, the energy saving control parameter may be selected through the energy saving control represented on the display interface, and the selected energy saving control parameter is configured on each highlighted station, that is, the selected station, and the station may adjust a working state or an operation mode thereof according to the energy saving control parameter to achieve the objective of energy saving. Meanwhile, after the energy saving control parameter is configured to the station and the station adjusts the working state according to the control parameter, a current energy consumption state of the station is fed back instantly, and the graphical energy consumption value of the station is updated, so that the user can intuitively know the energy consumption state of the station after the energy saving control in time.

It may be understood that, in the station energy consumption presentation method provided by the embodiment of the present invention, positions of the energy consumption value selection control, the region type selection menu, an energy saving mode selection menu, the stations, and the energy consumption labels on the display interface do not interfere with each other.

In the method provided by the embodiment of the present invention, in a process of station energy consumption presentation, the energy consumption value selection control, the region type selection menu, the energy saving mode selection menu, the stations, and the energy consumption labels are staggered, so as to highlight the stations and the energy consumption labels to bring convenience to viewing by the administrator.

Figure 16:
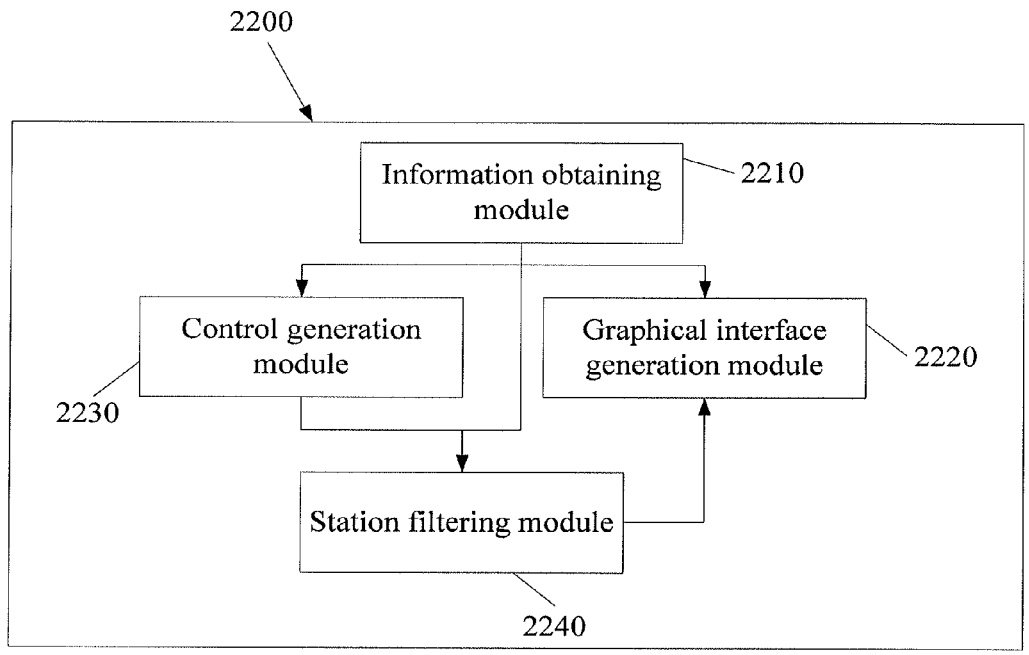
FIG. 16 is a schematic diagram of a station energy consumption management system according to an embodiment of the present invention.

Referring to FIG. 16, a station energy consumption management system 2200 provided by another embodiment of the present invention includes:

an information obtaining module 2210, configured to obtain location information of a station and an energy consumption value that corresponds to the station;

a graphical interface generation module 2220, configured to graphically represent, according to the obtained location information and corresponding energy consumption value of the station, the station and the energy consumption value that corresponds to the station on a display interface;

a control generation module 2230, configured to generate an energy consumption value selection control that is graphical and presented on the display interface, where the energy consumption value selection control is configured to select at least one target energy consumption value or a target energy consumption value range; and a station filtering module 2240, configured to obtain the at least one target energy consumption value or the target energy consumption value range selected through the energy consumption value selection control, and highlight, according to the target energy consumption value or the target energy consumption value range selected by the energy consumption value selection control, the graphical station complying with a preset display rule and the graphical energy consumption value that corresponds to the graphical station complying with the preset display rule.

Each functional module of the station energy consumption management system 2200 provided by the embodiment of the present invention may be configured to perform the process of the station energy consumption patent method 100 shown in FIG. 3, a specific working principle and implementation mechanism of which are not repeated. For detailed content, reference may be made to descriptions of the station energy consumption management method in FIG. 3.

In the station energy consumption management system, the geographical location information of the station and the energy consumption value of the station are obtained, and the geographical location information of the station and the energy consumption value of the station are graphically represented on the display interface, so that an administrator can intuitively observe geographical distribution of the station and an energy consumption condition of each station. The energy consumption value selection control for selecting the energy consumption value or the energy consumption value range is generated on the display interface, so that the administrator can rapidly and conveniently select a desired target energy consumption value or target energy consumption value range. After the target energy consumption value or the target energy consumption range is selected, the graphical station complying with a preset display rule and the graphical energy consumption value that corresponds to the graphical station complying with the preset display rule are highlighted, so that the administrator can intuitively select a desired station, and rapidly understand the energy consumption condition corresponding to the station, so as to make energy consumption management of the station convenient.

Figure 17:
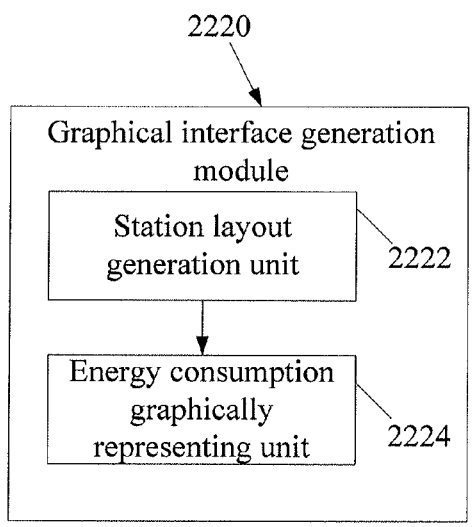
FIG. 17 is a schematic diagram of a graphical interface generation module in the station energy consumption management system in FIG. 15.

Referring to FIG. 17, in the station energy consumption management system 2200 provided by the embodiment of the present invention, the graphical interface generation module 2220 includes:

a station layout generation unit 2222, configured to generate a visual station distribution diagram according to the obtained location information of the station; and an energy consumption graphically representing unit 2224, configured to graphically represent the obtained energy consumption value corresponding to the station in the visual station distribution diagram, where the graphical station energy consumption value and a geometric position of the corresponding station in the station distribution diagram are associated with each other.

In the station energy consumption management system 2200 provided by the embodiment of the present invention, the graphical interface generation module 2220 generates the visual distribution diagram of the station according to the location information of the station, so that an administrator can locate the station conveniently. Meanwhile, the corresponding graphical energy consumption value of the station is associated with the station with respect to the geometric position, so that the administrator can rapidly understand the energy consumption state of the station.

Figure 18:
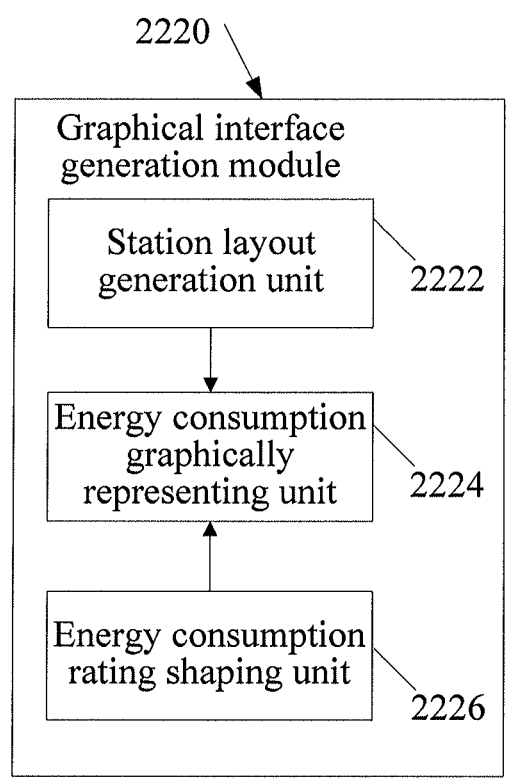
FIG. 18 is a schematic diagram of another graphical interface generation module in the station energy consumption management system in FIG. 15.

Referring to FIG. 18, in the station energy consumption management system 2200 provided by the embodiment of the present invention, the graphical interface generation module 2220 further includes:

an energy consumption rating shaping unit 2226, configured to rate energy consumption of the stations according to the energy consumption values that correspond to the stations, and apply different visual elements to stations of different energy consumption levels.

In the station energy consumption management system 2200 provided by the embodiment of the present invention, the energy consumption rating shaping unit 2226 in the graphical interface generation module 2220 applies different visual elements to stations of different energy consumption levels, so as to further improve identifiability of the energy consumption condition, so that the administrator can rapidly identify the energy consumption label of each station, thereby determining the energy consumption state of each station.

Further, the station filtering module 2240 in the station energy consumption management system 2200 provided by the embodiment of the present invention is specifically configured to compare the energy consumption value of the station with the selected target energy consumption value or target energy consumption value range, and highlight the graphical station that has the energy consumption value greater than the target energy consumption value and the graphical energy consumption value that corresponds to the graphical station.

In the station energy consumption management system 2200 provided by the embodiment of the present invention, it is specified that the preset display rule is specifically set to display the graphical station that has the energy consumption value greater than the target energy consumption value and the graphical energy consumption value that corresponds to the graphical station, so as to enable a display manner of the graphical station and the graphical energy consumption value that corresponds to the graphical station to comply with a daily operating habit of a user better, so that the user can rapidly grasp, according to experience thereof, a method of using the energy consumption value selection control, thereby improving interface friendliness of the station energy consumption management method of the present invention.

Figure 19:
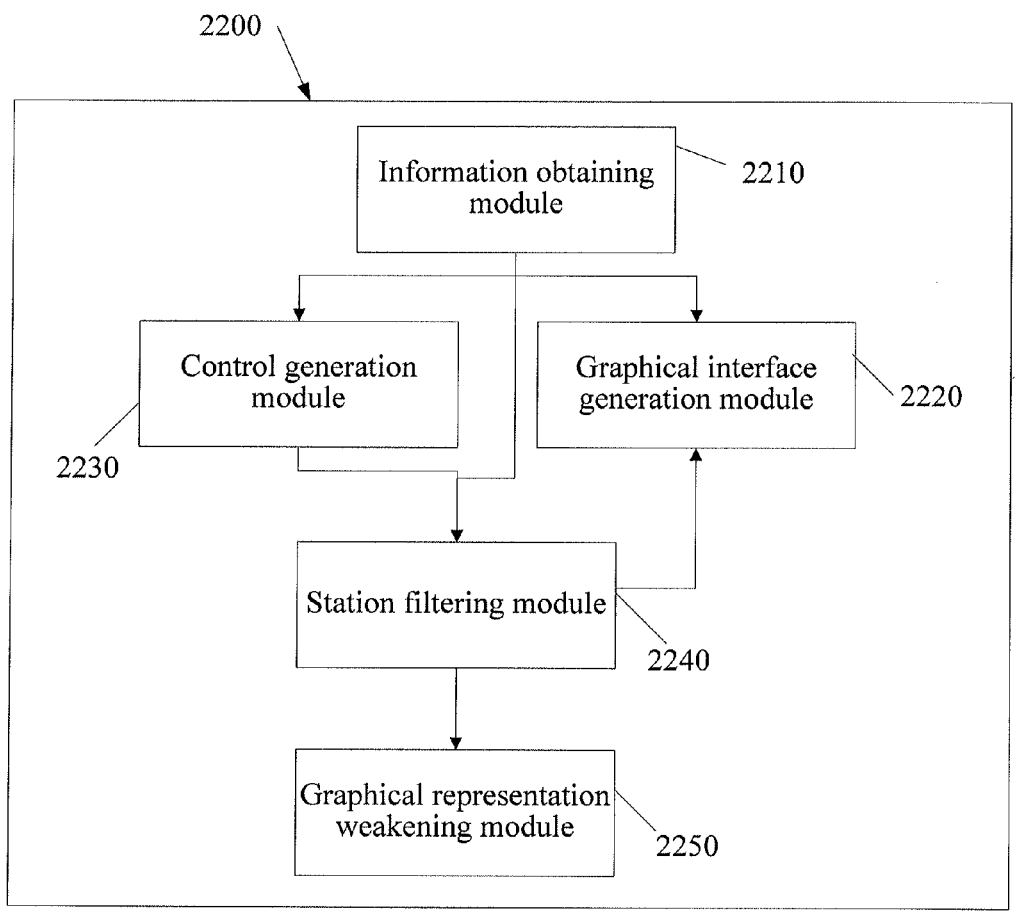
FIG. 19 is a schematic diagram of a station energy consumption management system according to another embodiment of the present invention.

Further, referring to FIG. 19, the station energy consumption management system 2200 provided by the embodiment of the present invention further includes a graphical representation weakening module 2250, which is configured to weaken representation of a graphical station not complying with the preset display rule and a corresponding graphical energy consumption value, at the same time of or after the comparing the energy consumption value of the station with the selected target energy consumption value or target energy consumption value range and highlighting the station that has the energy consumption value greater than the target energy consumption value.

In the station energy consumption management system 2200 provided by the embodiment of the present invention, the graphical representation weakening module 2250 weakens representation of the station not complying with the preset display rule and the energy consumption state that corresponds to the station, so as to further highlight the selected station that comlies with the preset display rule and the corresponding energy consumption state, so that the administrator can manage the selected station conveniently.

Further, in the station energy consumption management system 2200 provided by the embodiment of the present invention, the control generation module 2230 is specifically configured to generate an energy consumption value selection control that is graphical and presented on the display interface, and associate the energy consumption value selection control with the energy consumption value corresponding to the station. A maximum target energy consumption value that is capable of being selected by the energy consumption value selection control is not smaller than an energy consumption value of a station consuming greatest energy, and a minimum target energy consumption value that is capable of being selected by the energy consumption value selection control is not greater than an energy consumption value of a station consuming least energy.

In the station energy consumption management system 2200 provided by the embodiment of the present invention, the energy consumption value selection control is associated with the energy consumption value that corresponds to the station, so that a value selection range of the energy consumption value selection control can match the current energy consumption value corresponding to the station, and the administrator can precisely select the target energy consumption value or the target energy consumption value range.

Further, in the station energy consumption management system provided by the embodiment of the present invention, the generating, by the control generation module 2230, the energy consumption value selection control that is graphical and presented on the display interface specifically includes: generating a graphical ruler that takes the energy consumption value as a scale, and generating at least one graphical vernier that is capable of moving along the graphical ruler to select the target energy consumption value or the target energy consumption value range.

In the station energy consumption management system 2200 provided by the embodiment of the present invention, the energy consumption value selection control is set as the ruler that takes the energy consumption value as a scale, and the vernier that is capable of moving along the graphical ruler is generated for a user to select the target energy consumption value, which complies with a use habit of the user, intuitively reflects a function of the energy consumption value selection control, saves a process in which the user is required to learn the use method and function of the energy consumption value selection control, and is convenient for use.

Figure 20:
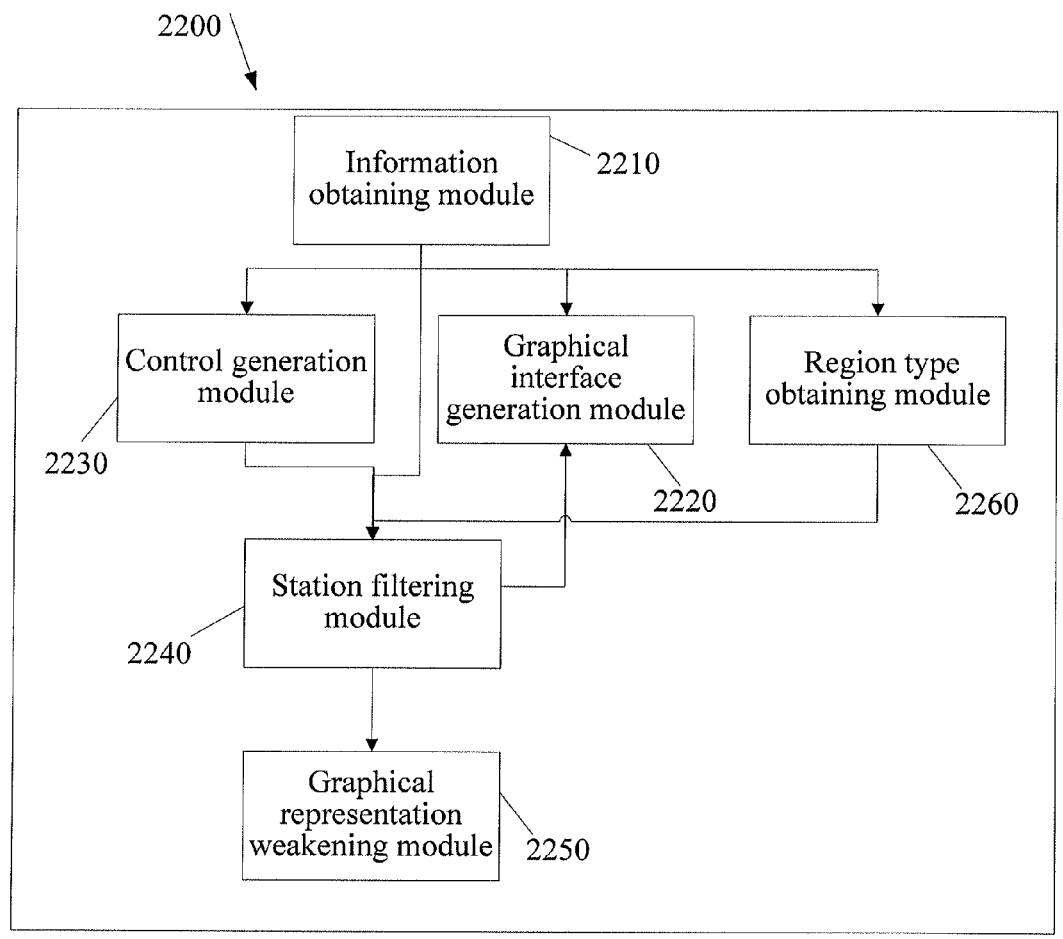
FIG. 20 is a schematic diagram of a station energy consumption management system according to another embodiment of the present invention.

Referring to FIG. 20, the station energy consumption management system 2200 provided by the embodiment of the present invention further includes:

a region type obtaining module 2260, configured to obtain a set region type.

Accordingly, the station filtering module 2240 is configured to match the location information of the graphical station complying with the preset display rule with the obtained region type, and highlight the graphical station matching the obtained region type and the graphical energy consumption value that corresponds to the graphical station.

Further, in the station energy consumption management system 2200 provided by the embodiment of the present invention, the graphical representation weakening module 2250 is further configured to weaken representation of the graphical station and the graphical energy consumption value that corresponds to the station, where the graphical station is among the graphical stations complying with the preset display rule and does not match the obtained region type.

The region type obtaining module 2260 in the station energy consumption management system 2200 provided by the embodiment of the present invention allows the user to obtain the station complying with region type characteristics according to the preset region type, so as to combine the selection of the target energy consumption value or the target energy consumption value range to select the station from a two-dimensional perspective, thereby further facilitating the use by the administrator and improving the experience of the user.

Figure 21:
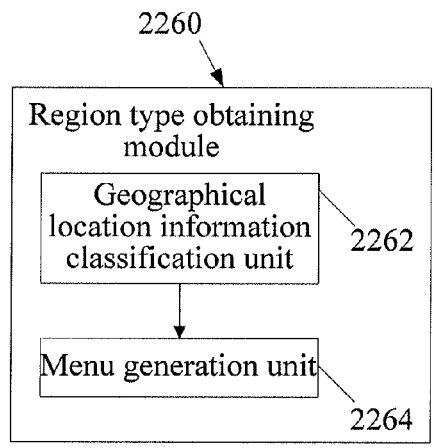
FIG. 21 is a schematic diagram of a region type obtaining module in the station energy consumption management system in FIG. 20.

Referring to FIG. 21, in the station energy consumption management system 2200 provided by the embodiment of the present invention, the region type obtaining module 2260 includes:

a geographical location information classification unit 2262, configured to classify the geographical location information of the station; and a menu generation unit 2264, configured to generate, according to the geographical location information classification, a region type selection menu represented on the display interface, where the region type selection menu is configured to select one or more region types.

In the station energy consumption management system 2200 provided by the embodiment of the present invention, the user is allowed to associate the geographical location information of the station with the region type, so as to combine the selection of the target energy consumption value to select the station from a two-dimensional perspective, thereby further facilitating the use by the administrator and improving the experience of the user.

Figure 22:
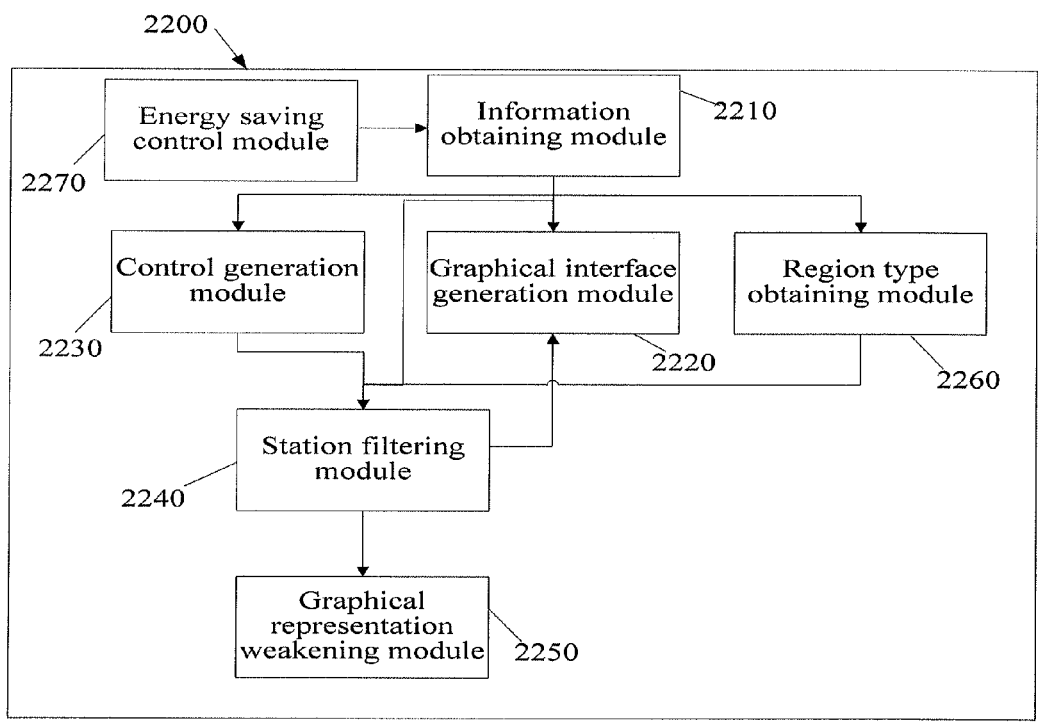
FIG. 22 is a schematic diagram of a station energy consumption management system according to another embodiment of the present invention.

Referring to FIG. 22, the station energy consumption management system 2200 provided by the embodiment of the present invention further includes:

an energy saving control module 2270, configured to generate an energy saving control represented on the display interface, select an energy saving control parameter of the station through the energy saving control, and configure the selected energy saving control parameter on the highlighted station. Accordingly, The information obtaining module 2210 is configured to obtain the location information of the station and the energy consumption value that corresponds to the station configured with the control parameter.

The graphical interface generation module 2230 is configured to graphically represent the station and the energy consumption value that corresponds to the station configured with the control parameter on the display interface according to the obtained location information of the station and the energy consumption value that corresponds to the station configured with the control parameter.

Figure 23:
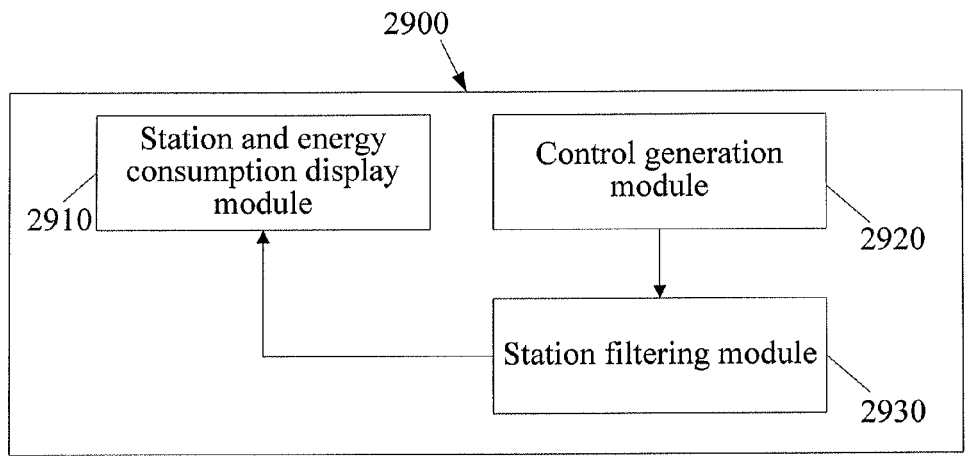
FIG. 23 is a schematic diagram of a station energy consumption presentation apparatus according to an embodiment of the present invention.

In the station energy consumption management system 2200 provided by the embodiment of the present invention, the energy saving control parameter may be selected through the energy saving control represented on the display interface, and the selected energy saving control parameter is configured on each highlighted station, that is, the selected station, and the station may adjust a working state or an operation mode thereof according to the energy saving control parameter to achieve the objective of energy saving. Meanwhile, after the energy saving control parameter is configured to the station and the station adjusts the working state according to the control parameter, a current energy consumption state of the station is fed back instantly, and the graphical energy consumption value of the station is updated, so that the user can intuitively know the energy consumption state of the station after the energy saving control in time. Referring to FIG. 23, a station energy consumption presentation apparatus 2900 provided by another embodiment of the present invention includes:

a station and energy consumption display module 2910, configured to display, through a display interface, stations in different geographical locations and energy consumption labels that correspond to the stations, where the energy consumption labels are used to indicate energy consumption levels of the stations;

a control generation module 2920, configured to generate an energy consumption value selection control on the display interface displaying the stations and the energy consumption labels of the stations, where the energy consumption value selection control is configured to select an energy consumption level or an energy consumption level range; and a station filtering module 2930, configured to highlight a station complying with a preset display rule and an energy consumption label that corresponds to the station according to the energy consumption level or the energy consumption level range selected by the energy consumption value selection control.

In the station energy consumption presentation apparatus 2900 provided by the embodiment of the present invention, the stations in the different geographical locations and the energy consumption labels that correspond to the stations are displayed on the display interface, so that an administrator can intuitively observe geographical distribution of the stations and an energy consumption condition of each station. The energy consumption value selection control that is configured to select the energy consumption level of the station is generated on the display interface, so that the administrator can select the corresponding energy consumption level or energy consumption level range through the energy consumption value selection control. After the energy consumption level or the energy consumption level range is selected, the graphical station complying with the preset display rule and the graphical energy consumption value that corresponds to the graphical station complying with the preset display rule are highlighted through the method by using the selected energy consumption level or energy consumption level range, so that the administrator can rapidly find a desired station to perform following processing.

Figure 24:
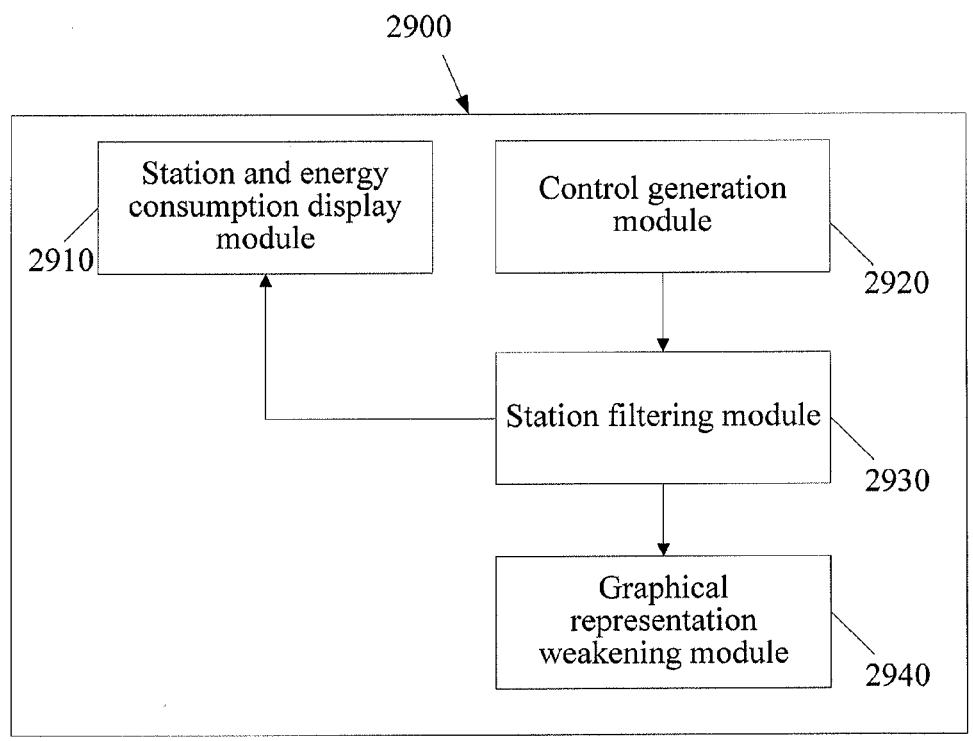
FIG. 24 is a schematic diagram of a station energy consumption presentation apparatus according to another embodiment of the present invention.

Referring to FIG. 24, the station energy consumption presentation apparatus 2900 provided by the embodiment of the present invention further includes:

a graphical representation weakening module 2940, configured to weaken representation of a station not complying with the preset display rule and an energy consumption label corresponding to the station.

In the station energy consumption presentation apparatus 2900 provided by the embodiment of the present invention, representation of the station not complying with the preset display rule and the energy consumption label that corresponds to the station are weakened, so as to further highlight the selected station complying with the preset display rule and the corresponding energy consumption state, so that the administrator can manage the selected station conveniently.

Figure 25:
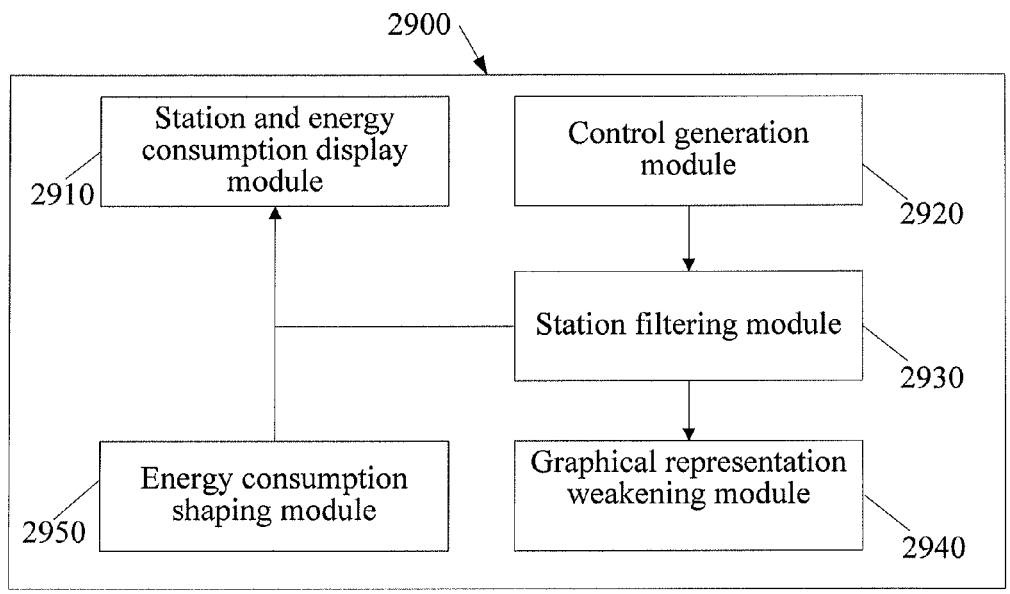
FIG. 25 is a schematic diagram of a station energy consumption presentation apparatus according to another embodiment of the present invention.

Referring to FIG. 25, the station energy consumption presentation apparatus 2900 provided by the embodiment of the present invention further includes:

an energy consumption shaping module 2950, configured to apply, when the stations correspond to multiple different energy consumption levels, different visual elements to energy consumption labels of the stations that belong to the different energy consumption levels.

In the station energy consumption presentation system 2900 provided by the embodiment of the present invention, applying different visual elements to stations of different energy consumption levels can further improve identifiability of the energy consumption condition, so that the administrator can rapidly identify the energy consumption label of each station, thereby determining the energy consumption state of each station.

Figure 26:
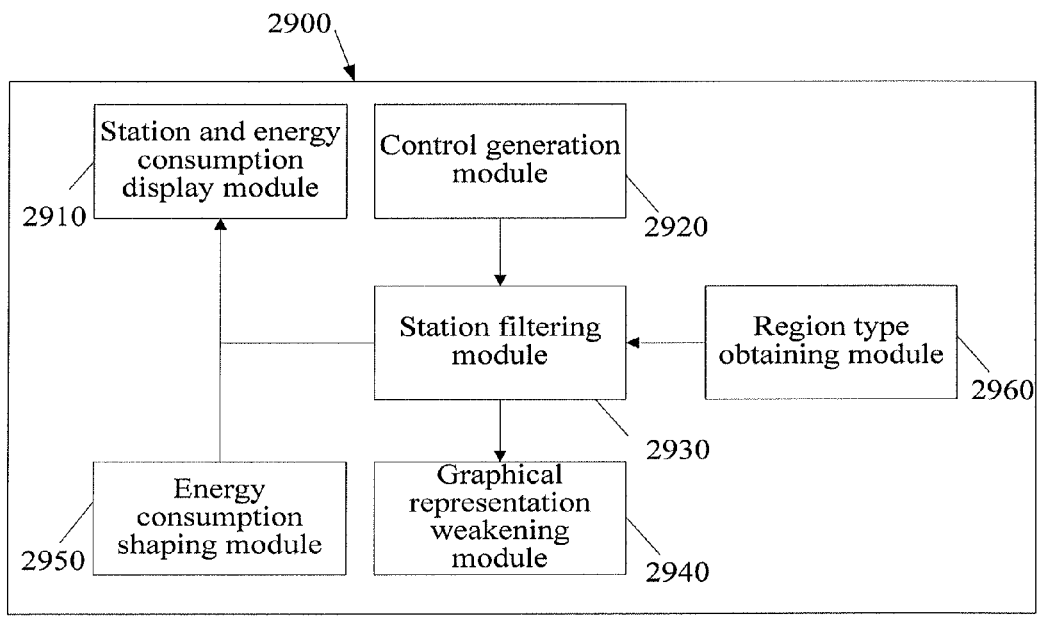
FIG. 26 is a schematic diagram of a station energy consumption presentation apparatus according to another embodiment of the present invention.

Referring to FIG. 26, the station energy consumption presentation apparatus 2900 provided by the embodiment of the present invention further includes:

a region type obtaining module 2960, configured to generate a region type selection menu represented on the display interface, where the region type of the station is associated with a region type in the region type selection menu.

Accordingly, the station filtering module 2930 is configured to highlight, when one or more region types in the region type selection menu is selected, a station and an energy consumption label that corresponds to the station, where the station matches the selected region type and complies with the preset display rule.

Further, in the station energy consumption presentation apparatus 2900 provided by the embodiment of the present invention, the graphical representation weakening module 2940 is further configured to weaken representation of a station and an energy consumption label that corresponds to the station, where the station complies with the preset display rule but does not match the selected region type.

In the station energy consumption presentation apparatus 2900 provided by the embodiment of the present invention, the user is allowed to associate the geographical location information of the station with the region type, so as to combine the selection of the target energy consumption value to select the station from a two-dimensional perspective, thereby further facilitating the use by the administrator and improving the experience of the user.

Figure 27:
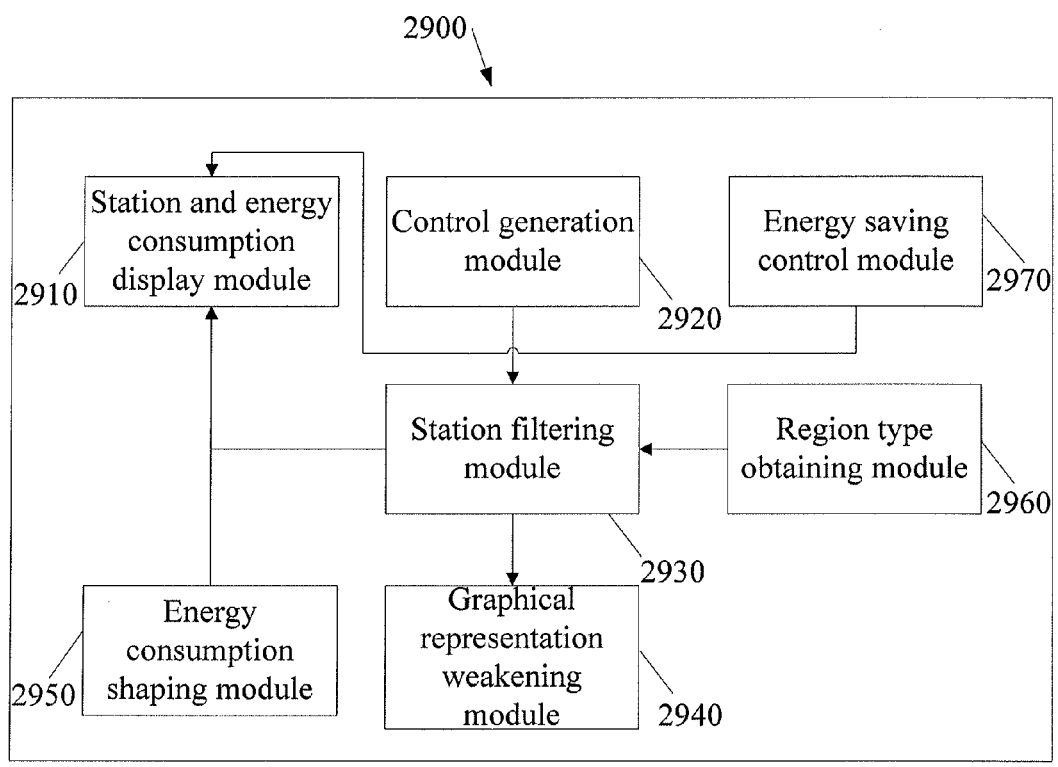
FIG. 27 is a schematic diagram of a station energy consumption presentation apparatus according to another embodiment of the present invention.

Referring to FIG. 27, the station energy consumption presentation apparatus 2900 provided by the embodiment of the present invention further includes:

an energy saving control module 2970, configured to generate an energy saving control represented on the display interface, where the energy saving control is configured to select an energy saving control parameter of the station; after the energy saving control parameter selected by the energy saving control is configured on the highlighted station;

accordingly, the station and energy consumption display module 2910 is configured to display, through the display interface, the stations in the different geographical locations and the energy consumption label that corresponds to the station configured with the energy saving control parameter, where the energy consumption label is used to indicate an energy consumption level of the station.

Each functional module of the station energy consumption management system 2900 provided by the embodiment of the present invention may be configured to perform the process of the station energy consumption presentation method 200 shown in FIG. 12, a specific working principle and implementation mechanism of which are not repeated. For detailed content, reference may be made to descriptions of the station energy consumption presentation method in FIG. 12.

In the station energy consumption presentation apparatus 2900 provided by the embodiment of the present invention, the energy saving control parameter may be selected through the energy saving control represented on the display interface, and the selected energy saving control parameter is configured on each highlighted station, that is, the selected station, and the station may adjust a working state or an operation mode thereof according to the energy saving control parameter to achieve the objective of energy saving. Meanwhile, after the energy saving control parameter is configured to the station and the station adjusts the working state according to the control parameter, a current energy consumption state of the station is fed back instantly, and the graphical energy consumption value of the station is updated, so that the user can intuitively know the energy consumption state of the station after the energy saving control in time. Through the foregoing description of the embodiments, it may be clearly understood by persons skilled in the art that, the present invention may be accomplished by software plus necessary universal hardware, and definitely may also be accomplished by hardware, but in most cases, the present invention is preferably implemented through the former method. Based on such understanding, the technical solutions of the present invention or the part that makes contributions to the prior art can be substantially embodied in the form of a software product. The computer software product is stored in a readable storage medium, for example, a floppy disk, a hard disk, or an optical disk of the computer, and includes several instructions used to instruct a computer device (for example, a personal computer, a server, or a network device) to perform the methods according to the embodiments of the present invention.

What is claimed is:

1. A station energy consumption management method, comprising:
    obtaining location information of a station and an energy consumption value that corresponds to the station;
    generating a visual station distribution diagram according to the obtained location information of the station,
    graphically representing the obtained energy consumption value corresponding to the station in the visual station distribution diagram, wherein the graphical station energy consumption value and a geometric position of the corresponding station in the station distribution diagram are associated with each other;
    generating an energy consumption value selection control that is graphically represented on the display interface, wherein the energy consumption value selection control is configured to select at least one target energy consumption value or a target energy consumption value range; and
    obtaining the at least one target energy consumption value or the target energy consumption value range selected through the energy consumption value selection control, and highlighting the graphical station complying with a preset display rule and the graphical energy consumption value that corresponds to the graphical station complying with the preset display rule according to the target energy consumption value or the target energy consumption value range selected by the energy consumption value selection control.

2. The energy consumption management method according to claim 1, wherein the method further comprises:
    rating energy consumption of the stations into different energy consumption levels according to the energy consumption values corresponding to the stations, and assigning different visual factors to the stations of different energy consumption levels.

3. The station energy consumption management method according to claim 1, wherein the highlighting the graphical station complying with the preset display rule and the graphical energy consumption value that corresponds to the graphical station complying with the preset display rule according to the target energy consumption value or the target energy consumption value range selected by the energy consumption value selection control comprises: comparing the energy consumption value of the station with the selected target energy consumption value or target energy consumption value range, and highlighting the graphical station that has the energy consumption value greater than the target energy consumption value and the graphical energy consumption value that corresponds to the graphical station.

4. The station energy consumption management method according to claim 3, wherein at the same time of or after the comparing the energy consumption value of the station with the selected target energy consumption value or target energy consumption value range and highlighting the station that has the energy consumption value greater than the target energy consumption value, the method further comprises: weakening representation of a graphical station not complying with the preset display rule and a corresponding graphical energy consumption value.

5. The station energy consumption management method according to claim 1, wherein the generating the energy consumption value selection control that is graphically represented on the display interface wherein the energy consumption value selection control is configured to select at least one target energy consumption value or a target energy consumption value range comprises: generating the energy consumption value selection control that is graphically represented on the display interface, and associating the energy consumption value selection control with the energy consumption value corresponding to the station, wherein a maximum target energy consumption value that is capable of being selected by the energy consumption value selection control is not smaller than an energy consumption value of a station consuming greatest energy, and a minimum target energy consumption value that is capable of being selected by the energy consumption value selection control is not greater than an energy consumption value of a station consuming least energy.

6. The station energy consumption management method according to claim 5, wherein the generating the energy consumption value selection control that is graphically represented on the display interface comprises: generating a graphical ruler that takes the energy consumption value as a scale, and generating at least one graphical vernier that is capable of moving along the graphical ruler to select the target energy consumption value or the target energy consumption value range.

7. The station energy consumption management method according to claim 5, wherein the method further comprises: obtaining a set region type; and the highlighting the graphical station complying with the preset display rule and the graphical energy consumption value that corresponds to the graphical station complying with the preset display rule according to the target energy consumption value or the target energy consumption value range selected by the energy consumption value selection control comprises:

matching the location information of the graphical station complying with the preset display rule with the obtained region type, and highlighting the graphical station matching the obtained region type and the graphical energy consumption value that corresponds to the graphical station matching the obtained region type.

8. The station energy consumption management method according to claim 7, wherein the method further comprises: weakening representation of the graphical station and the graphical energy consumption value that corresponds to the station, wherein the graphical station is among the graphical stations complying with the preset display rule and does not match the obtained region type.

9. The station energy consumption management method according to claim 7, wherein the obtaining the set region type comprises: classifying the geographical location information of the station, and generating, according to the geographical location information classification, a region type selection menu represented on the display interface, wherein the region type selection menu is configured to select one or more region types.

10. The energy consumption management method according to claim 3, wherein the method further comprises: generating an energy saving control represented on the display interface, selecting an energy saving control parameter of the station through the energy saving control, and configuring the selected energy saving control parameter to the highlighted station, wherein accordingly the obtaining the location information of the station and the energy consumption value that corresponds to the station comprises: obtaining the location information of the station and the energy consumption value that corresponds to the station configured with the control parameter;

the graphically representing the station and the energy consumption value that corresponds to the station on the display interface according to the obtained location information of the station and corresponding energy consumption value comprises: graphically representing the station and the energy consumption value that corresponds to the station configured with the control parameter on the display interface according to the obtained location information of the station and the energy consumption value that corresponds to the station configured with the control parameter.

11. A station energy consumption presentation method, comprising:

displaying, through a display interface, stations in different geographical locations and energy consumption labels that correspond to the stations, wherein the energy consumption labels are used to indicate energy consumption levels of the stations;

generating an energy consumption value selection control on the display interface displaying the stations and the energy consumption labels of the stations, wherein the energy consumption value selection control is configured to select an energy consumption level or an energy consumption level range;

highlighting a station complying with a preset display rule and the energy consumption label that corresponds to the station complying with a preset display rule according to the energy consumption level or the energy consumption level range selected by the energy consumption value selection control; and weakening representation of a station not complying with the preset display rule and an energy consumption label that corresponds to the station.

12. The station energy consumption presentation method according to claim 11, wherein the method further comprises:

when the stations correspond to multiple different energy consumption levels, assigning different visual factors to energy consumption labels of the stations that belong to the different energy consumption levels.

13. The station energy consumption presentation method according to claim 12, wherein, the visual factor is a color, a geometric shape, a size or a combination of any two or three of the color, geometric shape and size.

14. The station energy consumption presentation method according to claim 11, wherein the method further comprises:

generating a region type selection menu represented on the display interface, wherein the region type of the station is associated with a region type in the region type selection menu;

the highlighting the station complying with the preset display rule and the energy consumption label that corresponds to the station complying with the preset display rule according to the energy consumption level selected by the energy consumption value selection control comprises: when one or more region types in the region type selection menu is selected, highlighting a station and the energy consumption label that corresponds to the station, wherein the station matches the selected region type and complies with the preset display rule.

15. The station energy consumption presentation method according to claim 14, wherein the method further comprises: weakening representation of a station and an energy consumption label that corresponds to the station, wherein the station complies with the preset display rule but does not match the selected region type.

16. The station energy consumption presentation method according to claim 14, further comprising:

generating an energy saving control represented on the display interface, wherein the energy saving control is configured to select an energy saving control parameter of the station; after the energy saving control parameter selected by the energy saving control is configured to the highlighted station, the displaying, through the display interface, the stations in the different geographical locations and the energy consumption labels that correspond to the stations wherein the energy consumption labels are used to indicate the energy consumption levels of the stations comprises: displaying, through the display interface, the stations in the different geographical locations and the energy consumption label that corresponds to the station configured with the energy saving control parameter, wherein the energy consumption label is used to indicate the energy consumption level of the station.

17. The station energy consumption presentation method according to claim 16, wherein, positions of the energy consumption value selection control, the region type selection menu, the energy saving mode selection menu, the stations, and the energy consumption labels on the display interface do not interfere with each other.

18. A station energy consumption management system, comprising:
an information obtaining module, configured to obtain location information of a station and an energy consumption value that corresponds to the station;
a graphical interface generation module, configured to graphically represent, according to the obtained location information and corresponding energy consumption value of the station, the station and the energy consumption value that corresponds to the station on a display interface;
wherein the graphical interface generation module comprises:
a station layout generation unit, configured to generate a visual station distribution diagram according to the obtained location information of the station, and
an energy consumption graphically representing unit, configured to graphically represent the obtained energy consumption value corresponding to the station in the visual station distribution diagram, wherein the graphical station energy consumption value and a geometric position of the corresponding station in the station distribution diagram are associated with each other;
a control generation module, configured to generate an energy consumption value selection control that is graphically represented on the display interface, wherein the energy consumption value selection control is configured to select at least one target energy consumption value or a target energy consumption value range; and
a station filtering module, configured to obtain the at least one target energy consumption value or the target energy consumption value range selected through the energy consumption value selection control, and highlight the graphical station complying with a preset display rule and the graphical energy consumption value that corresponds to the graphical station complying with the preset display rule according to the target energy consumption value or the target energy consumption value range selected by the energy consumption value selection control.

19. The station energy consumption management system according to claim 18, wherein the graphical interface generation module further comprises:
an energy consumption rating shaping unit, configured to rate energy consumption of the stations to different energy consumption levels according to the energy consumption values corresponding to the stations, and assign different visual elements to stations of different energy consumption levels.

20. The station energy consumption management system according to any one of claim 18, wherein the station filtering module is specifically configured to compare the energy consumption value of the station with the selected target energy consumption value or target energy consumption value range, and highlight the graphical station that has the energy consumption value greater than the target energy consumption value and the graphical energy consumption value that corresponds to the graphical station.

21. The station energy consumption management system according to claim 20, further comprising:
a graphical representation weakening module, configured to weaken representation of a graphical station not complying with the preset display rule and a corresponding graphical energy consumption value, at the same time of or after the comparing, by the station filtering module, the energy consumption value of the station with the selected target energy consumption value or target energy consumption value range and highlighting the station that has the energy consumption value greater than the target energy consumption value.

22. The station energy consumption management system according to claim 18, wherein the control generation module is specifically configured to generate an energy consumption value selection control that is graphically represented on the display interface, and associate the energy consumption value selection control with the energy consumption value corresponding to the station; wherein a maximum target energy consumption value that is capable of being selected by the energy consumption value selection control is not smaller than an energy consumption value of a station consuming greatest energy, and a minimum target energy consumption value that is capable of being selected by the energy consumption value selection control is not greater than an energy consumption value of a station consuming least energy.

23. The station energy consumption management system according to claim 22, wherein the generating, by the control generation module, the energy consumption value selection control that is graphically represented on the display interface specifically comprises: generating a graphical ruler that takes the energy consumption value as a scale, and generating at least one graphical vernier that is capable of moving along the graphical ruler to select the target energy consumption value or the target energy consumption value range.

24. The station energy consumption management system according to claim 22, further comprising:
a region type obtaining module, configured to obtain a set region type;
wherein accordingly, the station filtering module is configured to match the location information of the graphical station complying with the preset display rule with the obtained region type, and highlight the graphical station matching the obtained region type and the graphical energy consumption value that corresponds to the graphical station.

25. The station energy consumption management system according to claim 24, wherein the graphical representation weakening module is further configured to weaken representation of the graphical station and the graphical energy consumption value that corresponds to the station, wherein the graphical station is among the graphical stations complying with the preset display rule and does not match the obtained region type.

26. The station energy consumption management system according to claim 24, wherein the region type obtaining module comprises:
a geographical location information classification unit, configured to classify the geographical location information of the station; and
a menu generation unit, configured to generate, according to the geographical location information classification, a region type selection menu represented on the display interface, wherein the region type selection menu is configured to select one or more region types.

27. The station energy consumption management system according to claim 24, further comprising:
an energy saving control module, configured to generate an energy saving control represented on the display interface, select an energy saving control parameter of the station through the energy saving control, and configure the selected energy saving control parameter to the highlighted station, wherein accordingly, the information obtaining module is configured to obtain the location information of the station and the energy consumption value that corresponds to the station configured with the control parameter; and the graphical interface generation module is configured to graphically represent the station and the energy consumption value that corresponds to the station configured with the control parameter on the display interface according to the obtained location information of the station and the energy consumption value that corresponds to the station configured with the control parameter.

28. A station energy consumption presentation apparatus, comprising:

a station and energy consumption display module, configured to display, through a display interface, stations in different geographical locations and energy consumption labels that correspond to the stations, wherein the energy consumption labels are used to indicate energy consumption levels of the stations;

a control generation module, configured to generate an energy consumption value selection control on the display interface displaying the stations and the energy consumption labels of the stations, wherein the energy consumption value selection control is configured to select an energy consumption level or an energy consumption level range;

a station filtering module, configured to highlight a station complying with a preset display rule and an energy consumption label that corresponds to the station complying with a preset display rule according to the energy consumption level or the energy consumption level range selected by the energy consumption value selection control; and a graphical representation weakening module, configured to weaken representation of a station not complying with the preset display rule and an energy consumption label that corresponds to the station.

29. The station presentation apparatus according to claim 28, further comprising:

an energy consumption shaping module, configured to assign, when the stations correspond to multiple different energy consumption levels, different visual factors to energy consumption labels of the stations belonging to the different energy consumption levels.

30. The station presentation apparatus according to claim 28, further comprising:

a region type obtaining module, configured to generate a region type selection menu represented on the display interface, wherein the region type of the station is associated with a region type in the region type selection menu;

wherein accordingly, the station filtering module is configured to highlight, when one or more region types in the region type selection menu is selected, a station and an energy consumption label that corresponds to the station, wherein the station matches the selected region type and complies with the preset display rule.

31. The station presentation apparatus according to claim 28, wherein the graphical representation weakening module is further configured to weaken representation of a station and an energy consumption label that corresponds to the station, wherein the station complies with the preset display rule but does not match the selected region type.

32. The station presentation apparatus according to claim 31, further comprising:

an energy saving control module, configured to generate an energy saving control represented on the display interface, wherein the energy saving control is configured to select an energy saving control parameter of the station; after the energy saving control parameter selected by the energy saving control is configured on the highlighted station;

wherein accordingly, the station and energy consumption display module is configured to display, through the display interface, the stations in the different geographical locations and the energy consumption label that corresponds to the station configured with the energy saving control parameter, and the energy consumption label is used to indicate the energy consumption level of the station.

* * * * *